(12) United States Patent
Otake et al.

(10) Patent No.: US 12,489,822 B2
(45) Date of Patent: Dec. 2, 2025

(54) SERVICE PROVIDING SYSTEM

(71) Applicant: FUJIFILM Business Innovation Corp., Tokyo (JP)

(72) Inventors: Shin Otake, Kanagawa (JP); Tatsuro Suzuki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 255 days.

(21) Appl. No.: 18/190,062

(22) Filed: Mar. 24, 2023

(65) Prior Publication Data

US 2024/0007542 A1  Jan. 4, 2024

(30) Foreign Application Priority Data

Jul. 1, 2022 (JP) ................................ 2022-107209

(51) Int. Cl.
*H04L 67/51* (2022.01)
*H04L 9/40* (2022.01)
*H04L 67/1095* (2022.01)

(52) U.S. Cl.
CPC .............. *H04L 67/51* (2022.05); *H04L 63/10* (2013.01); *H04L 67/1095* (2013.01)

(58) Field of Classification Search
None
See application file for complete search history.

(56) References Cited

U.S. PATENT DOCUMENTS 10,868,875 B2 * 12/2020 Haltore ............... H04L 61/4511
11,570,126 B2   1/2023 Yuki
(Continued)

FOREIGN PATENT DOCUMENTS

| EP | 3318967 | 5/2018 |
|---|---|---|
| JP | 2017021846 | 1/2017 |
| JP | 2020145647 | 9/2020 |

OTHER PUBLICATIONS

Seiger et al., "Self-Healing for Distributed Workflows in the Internet of Things", Apr. 1, 2017, IEEE, 2017 IEEE International Conference on Software Architecture Workshops (ICSAW) (2017, pp. 72-79) (Year: 2017).*

(Continued)

*Primary Examiner* — Davoud A Zand
(74) *Attorney, Agent, or Firm* — JCIPRNET

(57) ABSTRACT

A service providing system includes a first apparatus including at least one agent unit that is connected to a service providing a pre-configured function over the Internet, and an execution unit that has first attribute data including state information about the first apparatus and setting information about a function of the first apparatus, and uses the first attribute data to execute an instructed function in cooperation with the agent unit, in a case of receiving the instruction regarding execution of the function; and a second apparatus including a shadow execution unit that has second attribute data corresponding to the first attribute data and executes the instruction received from the service and a process requested by the execution unit, in which through a first connection provided between the execution unit and the shadow execution unit, the execution unit checks whether there is a message generated by the shadow execution unit, acquires the message in a case where there is the message, and delivers the message to the agent unit represented by identification information attached to the message, and the agent unit to which the message is delivered acquires information necessary for executing a function from the service, through a second connection provided between the agent unit and the associated service, and executes the instructed function.

10 Claims, 18 Drawing Sheets

(56) References Cited

U.S. PATENT DOCUMENTS

| | | |
|---|---|---|
| 2008/0133775 A1 | 6/2008 | Peterson et al. |
| 2011/0276676 A1* | 11/2011 | Kang .................... H04L 69/321 |
| | | 709/223 |
| 2022/0036302 A1* | 2/2022 | Cella ................... H04L 67/1097 |
| 2022/0229636 A1* | 7/2022 | Nayak .................... G06N 20/00 |

OTHER PUBLICATIONS

"Search Report of Europe Counterpart Application", issued on Nov. 27, 2023, pp. 1-10.

* cited by examiner

FIG. 12

| ATTRIBUTE | VALUE TO BE ACQUIRED | PRIORITY INFORMATION |
|---|---|---|
| TLS SETTING | ○ INVALID<br>○ VALID | ○ DS PRIORITY<br>RD PRIORITY<br>TIME STAMP<br>RD FIXED<br>SD FIXED |
| IP ADDRESS | ○ DHCP<br>FIXED | DS PRIORITY |
| TIME SERVER | INVALID<br>○ VALID: SERVER IP ADDRESS | DS PRIORITY |
| AUTHENTICATION MODE | INVALID<br>○ MAIN BODY AUTHENTICATION<br>EXTERNAL AUTHENTICATION | RD PRIORITY |
| COLOR COPY PROHIBITION | INVALID<br>○ VALID | RD PRIORITY |
| NICK NAME | ANY TEXT STRING | TIME STAMP |
| PRESENCE OF FINISHER | ABSENCE<br>○ PRESENCE | RD FIXED |
| REMAINING AMOUNT OF TONER/PAPER | ANY NUMERICAL VALUE | RD FIXED |

FIG. 13

| UPDATE PRIORITY | PRIORITY 1 [SET IN NEXT TERM] | PRIORITY 2 [SET BY POWERED ON/OFF] | PRIORITY 3 [SET AT DESIGNATED DATE AND TIME/FREQUENCY] |
|---|---|---|---|
| ATTRIBUTE | · TLS SETTING<br>· IP ADDRESS<br>· TIME SERVER CHANGE<br>· REMAINING TONER AMOUNT<br>· REMAINING PAPER AMOUNT | · ADDITION OF FINISHER<br>· ADDITION OF IC CARD READER<br>· CHANGE OF PRINTER PORT<br>· SETTING CHANGE OF MAIL NOTIFICATION<br>· ADDITION OF NETWORK CARD | · JOB LOG (DESIGNATED DATE FOR EACH MONTH)<br>· MONITORING LOG (FOR EACH MONITORING PERIOD)<br>· SYSTEM LOG (EACH DS REQUEST)<br>· DNS SERVER ADDRESS (EACH TIME NETWORK ENVIRONMENT SWITCHES)<br>· CHANGE IN AUTHENTICATION MODE (EACH TIME SETTING CHANGES)<br>· APPLICATION VERSION (EACH UPDATE) |

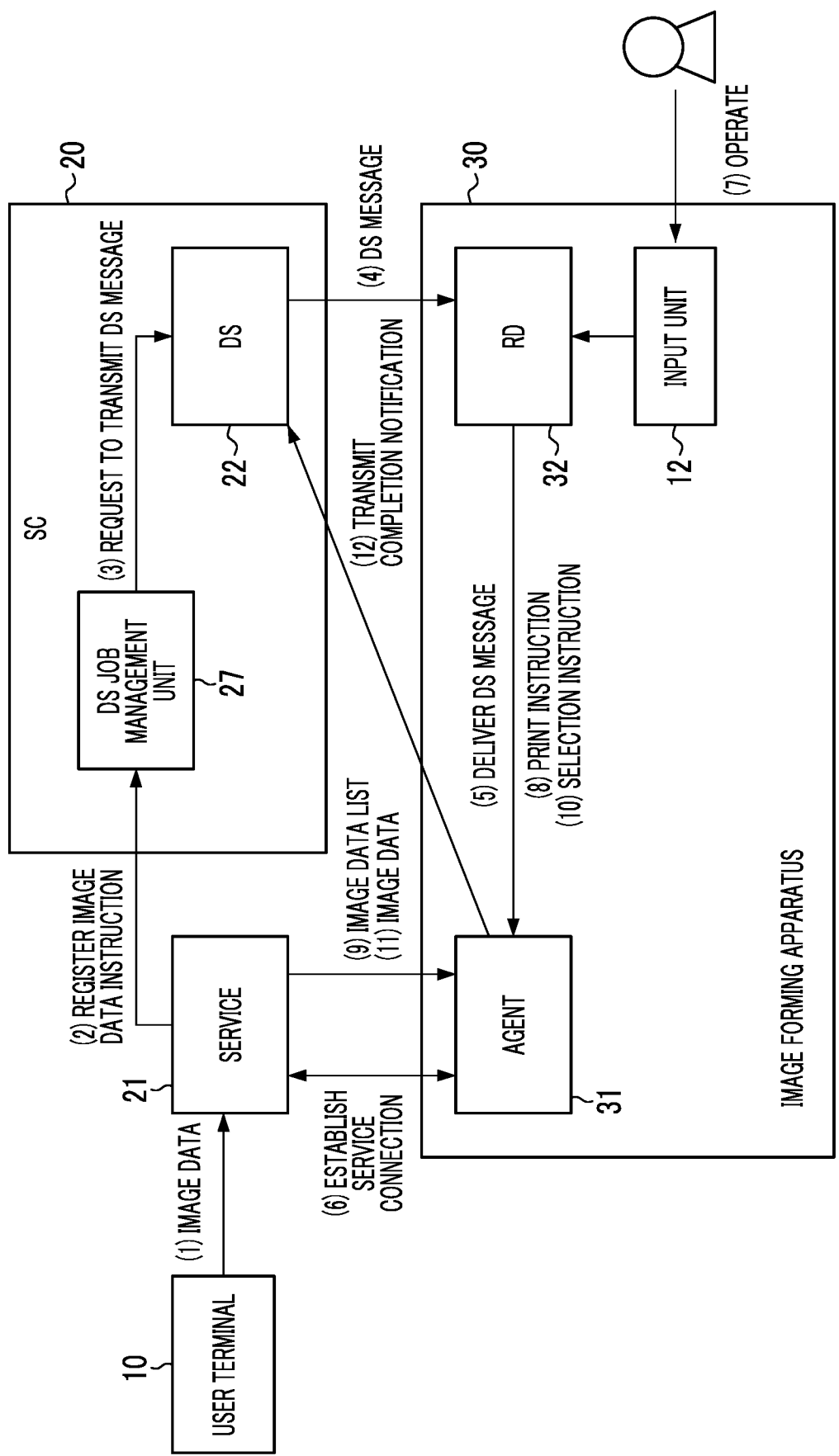

SERVICE PROVIDING SYSTEM

CROSS-REFERENCE TO RELATED APPLICATIONS

This application is based on and claims priority under 35 USC 119 from Japanese Patent Application No. 2022-107209 filed Jul. 1, 2022.

BACKGROUND (i) Technical Field

The present disclosure relates to a service providing system.

(ii) Related Art

JP2017-21846A discloses an image processing system including a server and an image forming apparatus, in which the image forming apparatus includes a reception unit that receives document data from the server over a network, a printing unit that prints the received document data, and a transmission unit that creates print information for printing the document data after printing the document data, and transmits the print information in association with the document data, to the server, the print information is stored in the server in association with the document data, the print information includes information on the printing user or the printing unit that performs printing as a print history, and the server executes a deletion process of the document data by using the information on the printing user or the printing unit that performs printing included in the print history.

SUMMARY

In recent years, there has been an apparatus such as an image forming apparatus that uses information registered in a service on a network that receives an instruction from a user, and executes an instructed function (for example, printing). In such an apparatus, a service that can be linked is designated in advance, and a function cannot be executed in cooperation with a service other than the designated service.

Therefore, such an apparatus cannot perform a function in cooperation with another service provided by, for example, a third party.

Aspects of non-limiting embodiments of the present disclosure relate to a service providing system that capable of connecting to a service that is different from a service on a network scheduled to be a connection destination in advance, and executing a function provided in an apparatus in cooperation with the connection-destination service.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a service providing system including: a first apparatus including at least one agent unit that is connected to a service providing a pre-configured function over the Internet, and an execution unit that has first attribute data including state information about the first apparatus and setting information about a function of the first apparatus, and uses the first attribute data to execute an instructed function in cooperation with the agent unit, in a case of receiving the instruction regarding execution of the function; and a second apparatus including a shadow execution unit that has second attribute data corresponding to the first attribute data and executes the instruction received from the service and a process requested by the execution unit, in which, through a first connection provided between the execution unit and the shadow execution unit, the execution unit checks whether there is a message generated by the shadow execution unit, acquires the message in a case where there is the message, and delivers the message to the agent unit represented by identification information attached to the message, and the agent unit to which the message is delivered acquires information necessary for executing a function from the service, through a second connection provided between the agent unit and the associated service, and executes the instructed function.

BRIEF DESCRIPTION OF THE DRAWINGS

Exemplary embodiment(s) of the present invention will be described in detail based on the following figures, wherein:

FIG. 12 is a diagram showing an example of a priority table;

FIG. 13 is a diagram showing a classification example of update priority;

FIG. 18 is a sequence diagram illustrating an example of a data flow in a case where a print function using a print service is executed.

DETAILED DESCRIPTION

Hereinafter, an exemplary embodiment of the present disclosure will be described in detail with reference to the drawings. The identical components and the identical processes are denoted by the identical reference signs throughout the drawings, and redundant description will be omitted.

Figure 1:
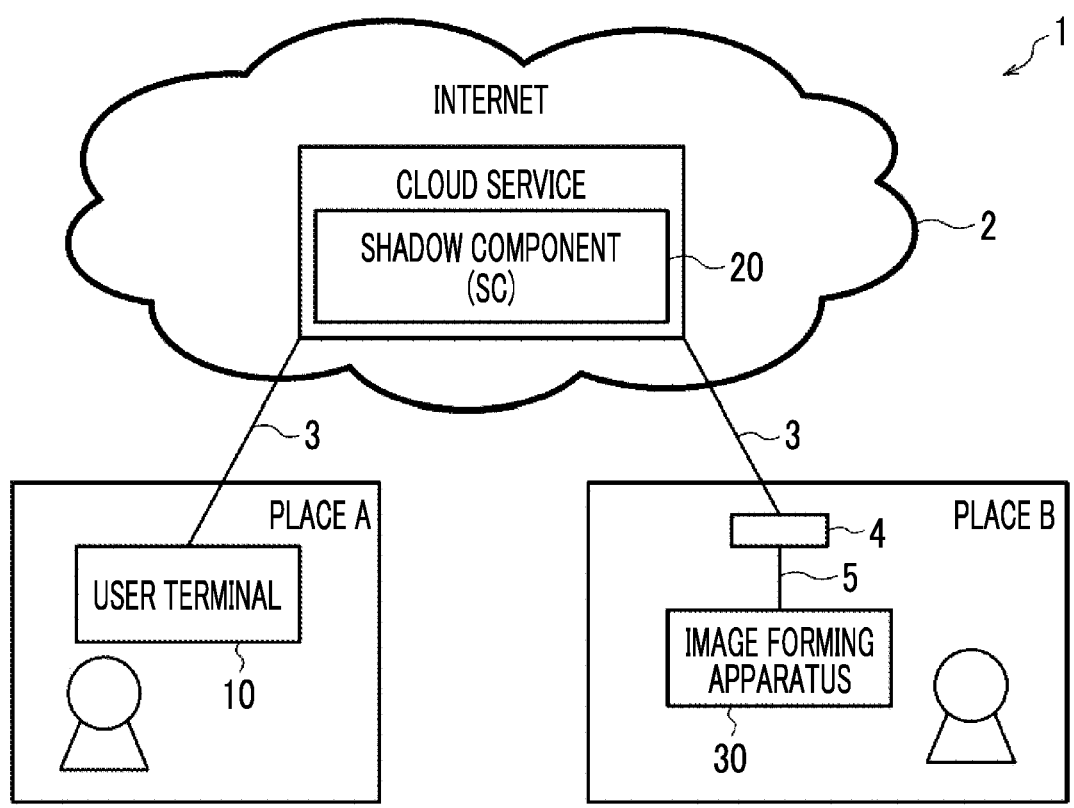
FIG. 1 is a diagram showing a system configuration example of a service providing system.

FIG. 1 is a diagram showing a system configuration example of a service providing system 1 according to the present exemplary embodiment. As shown in FIG. 1, the service providing system 1 includes a user terminal 10, a shadow component 20, and an image forming apparatus 30, and provides a user with a service using the image forming apparatus 30.

The user terminal 10 is, for example, an information device existing at a place A and is operated by a user who uses the service providing system 1. Specifically, the user terminal 10 is an information device having a data input/output function, a data processing function, and a communication function, such as a computer, a smartphone, a tablet terminal, and a wearable terminal. The user terminal 10 may be a portable information device for which the using place changes, or may be a fixed type information device for which the using place is fixed in advance.

The image forming apparatus 30 which is an example of the first apparatus according to the present disclosure is an apparatus that performs a data process on an image in response to an instruction of a user. Examples of the data process on an image include a scan function of reading the contents described on a paper medium such as a document as image data, a copy function of reproducing the contents of the image data of a document acquired by the scan function as an image on a paper medium as it is, and a print function of forming image data designated in advance by the user as an image on a paper medium.

The image forming apparatus 30 stores attribute data regarding various functions included in the image forming apparatus 30. The attribute data is a collection of attributes representing setting contents that define the state of the image forming apparatus 30 and the operation of the image forming apparatus 30, and the attributes are represented by a combination of attribute items and values. The attribute item is an identifier for identifying what the value of the image forming apparatus 30 represents, such as an IP address or a remaining amount of paper accommodated in the image forming apparatus 30. That is, the "attribute" according to the present disclosure represents any one combination among combinations of attribute items and values.

The image forming apparatus 30 is installed in a remote place (for example, a workplace: represented as "place B" in the example of FIG. 1) different from a place A (for example, home) where the user operates the user terminal 10.

Therefore, in a case where a user in the place B (hereinafter, referred to as a "neighboring user") uses the service using the image forming apparatus 30, the neighboring user touches and operates the operation panel of the image forming apparatus 30 to give an instruction to the image forming apparatus 30, but in a case where a user at the place A (hereinafter, referred to as a "remote user") uses the service using the image forming apparatus it is not practical for the remote user to move to the place B and operate the image forming apparatus 30.

Therefore, a shadow component 20 is provided on the Internet 2 which is an example of a network such that a remote user can use the service using the image forming apparatus 30 from the place A. Hereinafter, the remote user and the neighboring user may be collectively referred to as a "user".

The shadow component 20 is, for example, a server constructed by using a cloud service provided on the Internet 2. The shadow component 20 is connected to the user terminal through a communication line 3, and is connected to the image forming apparatus 30 via a firewall 4 accommodating a local area network (LAN) 5 connected to the image forming apparatus 30 through the communication line 3.

Such a shadow component 20 has the state information of the image forming apparatus 30, and metadata 24 that stores attribute data included in the image forming apparatus 30, such as set values that define the apparatus configuration of the image forming apparatus 30 and the operation of the image forming apparatus 30. The metadata 24 is a data set including attribute data.

That is, the shadow component 20 stores the same attribute data as the attribute data of the image forming apparatus 30 installed at the place B as the metadata 24.

Therefore, the remote user issues an instruction to the shadow component 20 from the user terminal 10 and checks a response from the shadow component 20 to the instruction by using the user terminal 10, thereby virtually operating the image forming apparatus 30 installed at the place B.

The attribute data is data represented by a combination of an attribute item and a value, and the attribute data including the state information of the image forming apparatus 30 and the setting information of the image forming apparatus 30 is an example of first attribute data. On the other hand, the metadata 24 managed by the shadow component 20 is an example of second attribute data, and is data on synchronization performed with the first attribute data which is the attribute data of the image forming apparatus 30.

In addition, the connection form of the communication line 3 and the LAN 5 in the service providing system 1 is not limited, and any connection form of wired, wireless, or a combination of wired and wireless may be used. Further, the communication line 3 may be, for example, a dedicated line or a virtual private network (VPN) line.

Further, in order to prevent the image forming apparatus 30 from receiving unauthorized access from the Internet 2, the firewall 4 is set such that data other than a response to a request transmitted from the image forming apparatus 30 is not received from the Internet 2.

Figure 2:
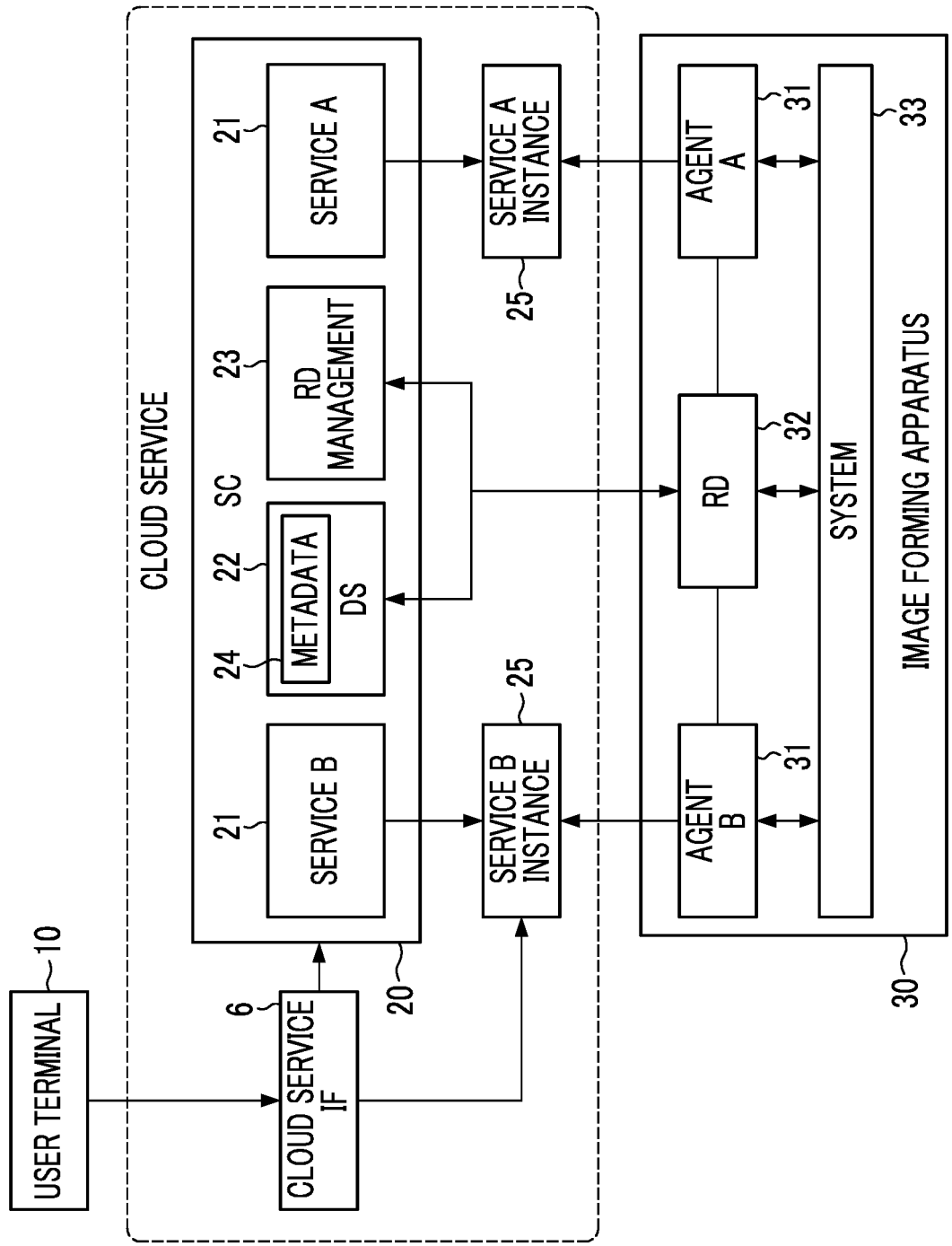
FIG. 2 is a diagram showing an example of functional configurations of a shadow component and an image forming apparatus.

FIG. 2 is a diagram showing an example of functional configuration of each of the shadow component 20 (hereinafter referred to as "SC 20") and the image forming apparatus 30 implemented by using the cloud service, and an example of cooperation between functional blocks.

A cloud service interface (IF) 6 is provided in the cloud service, temporarily receives an instruction from a remote user transmitted through the user terminal 10, converts the received instruction into an instruction format used in the shadow component 20 to transfer the converted instruction to the shadow component 20, and connects to a service instance 25 described later corresponding to the service used by the remote user to transmits a processing situation and a result of the service to the user terminal 10. That is, the cloud service IF 6 functions as an interface for connecting the user terminal 10 and the SC 20.

As described above, in a case where the remote user intends to use the function provided in the image forming apparatus 30, the interface specifications of the SC 20 can be kept secret by connecting the user terminal 10 to the cloud service IF6 instead of directly connecting to the SC 20. In a case where a person concerned with the developer of the image forming apparatus 30 uses the service providing system 1 as a remote user, the user terminal 10 may be directly connected to the SC 20 without going through the cloud service IF 6.

Examples of the SC 20 include a service 21, a digital shadow (DS) 22, and a real device (RD) management 23, and the DS 22 further includes metadata 24.

The service 21 is a component having design information that defines a function of the image forming apparatus 30. In a case where there are a plurality of functions of the image forming apparatus 30 such as a scan function, a print function, and an attribute setting function, there is a service 21 corresponding to each function. Hereinafter, in a case where the service 21 is described separately, "service A" and "service B" are expressed without adding the reference numeral "21" to the end.

The DS 22 is a component that executes a process in response to a requested instruction in cooperation with the service 21 and the RD management 23.

The RD management 23 is a component that checks authenticity of the RD 32. The RD 32 is an interface in the image forming apparatus 30 with the DS 22 in a case where the SC 20 cooperates with the image forming apparatus 30 to provide the function provided in the image forming apparatus 30 to the user requesting the service as the service 21. The RD management 23 determines whether or not the connection-destination image forming apparatus 30 is a pre-registered regular image forming apparatus 30. In a case where the connection-destination image forming apparatus 30 is not a regular image forming apparatus 30, the RD management 23 does not connect the SC 20 and the image forming apparatus 30, and improves the security performance of the service providing system 1.

The metadata 24 managed by the DS 22 is a collection of attribute items and values to be synchronized between the SC 20 and the image forming apparatus 30. Attribute data synchronization is a process of mutually notifying the value of an attribute item such that the attribute item retains the same value between the SC 20 and the image forming apparatus 30, even in a case where the value of the attribute item is updated in at least one of the SC 20 or the image forming apparatus 30. Out of the attribute data of the image forming apparatus 30, the value of the attribute item (hereinafter, referred to as "synchronization target attribute item") designated as the synchronization target in advance is included in the metadata 24. The value of the attribute item is a value associated with the attribute item, and the value of the attribute item includes a numerical value and a text string. As the synchronization target attribute item, the attribute items of all the attributes included in the attribute data may be targeted, or a predetermined attribute item may be targeted. Further, an attribute item of which value has been changed during a predetermined period or a newly set attribute item may be targeted.

The service instance 25 is a component representing an entity of the service 21, is associated with each service 21, and is deployed on the cloud service. Specifically, the service instance 25 is a component that includes an interface that receives an instruction regarding a function of the image forming apparatus 30 and executes a process according to the design information defined in the service 21.

In FIG. 2, the service instance 25 representing the entity of the service A is the service A instance 25, and the service instance 25 representing the entity of the service B is the service B instance 25. The term "service instance 25" is a general term for components representing an entity of the service 21, which is used in a case where it is not necessary to separately describe each of the components, such as a service A instance 25 and a service B instance 25. In the example of FIG. 2, only the connection between the cloud service IF 6 and the service B instance 25 is shown, but the cloud service IF 6 and the service A instance 25 may be connected as necessary.

As described above, the service instance 25 is a component that actually executes the function defined by the associated service 21, and the service 21 and the service instance 25 are closely linked to each other, so that the service 21 and the service instance 25 may be collectively referred to simply as "the service 21" to the extent that there is no misunderstanding in the description. Therefore, the service 21 that executes the function of the image forming apparatus 30 on the cloud service is an example of a service component.

On the other hand, the image forming apparatus 30 associated with the SC 20 includes, for example, an agent 31, an RD 32, and a system 33.

The agent 31 is a component for providing the function of the image forming apparatus 30 to the outside, and more specifically, is a component for providing the function to the user in cooperation with the service instance 25. The agent 31 and the service instance 25 are associated with each other for each type of function.

For example, the service A instance 25 that provides the function A defined by the service A is associated with the agent A that provides the function A, and the service B instance 25 that provides the function B defined by the service B is associated with the agent B that provides the function B. That is, in a case where viewed from the service instance 25, the agent 31 can be regarded as a client that processes the execution request of the function received by the service 21 in cooperation with the service 21. Therefore, the agent 31 is an example of the cooperation unit.

As an example, the service 21 will be described as having agent identification information for uniquely specifying an agent 31 that executes a function associated with the service 21 in advance, but a method of managing the agent identification information is not limited to this. For example, the service 21 may have only information indicating a type of a function to be executed by the service 21, and the DS 22 may associate the agent identification information based on the information indicating the type.

In addition, as described above, in a case where the agent 31 is described separately for each function, "agent A" and "agent B" are expressed without adding the reference numeral "31" to the end.

As described above, the RD 32 functions as an interface with the DS 22 in a case where the SC 20 cooperates with the image forming apparatus 30 to provide the function provided in the image forming apparatus 30 to the user as the service 21. Specifically, the RD 32 functions as an interface for performing a synchronization process on attribute data with the SC 20, and ensures authenticity of the image forming apparatus 30. Therefore, the RD 32 is connected to the DS 22 and the RD management 23 of the SC 20, respectively, and is connected to the respective agents 31 and the system 33 inside the image forming apparatus 30.

The system 33 manages all the attribute items in the image forming apparatus 30, refers to the managed attribute items, and controls the execution of the function included in the image forming apparatus 30 in cooperation with the respective agents 31 and the RD 32.

Figure 3:
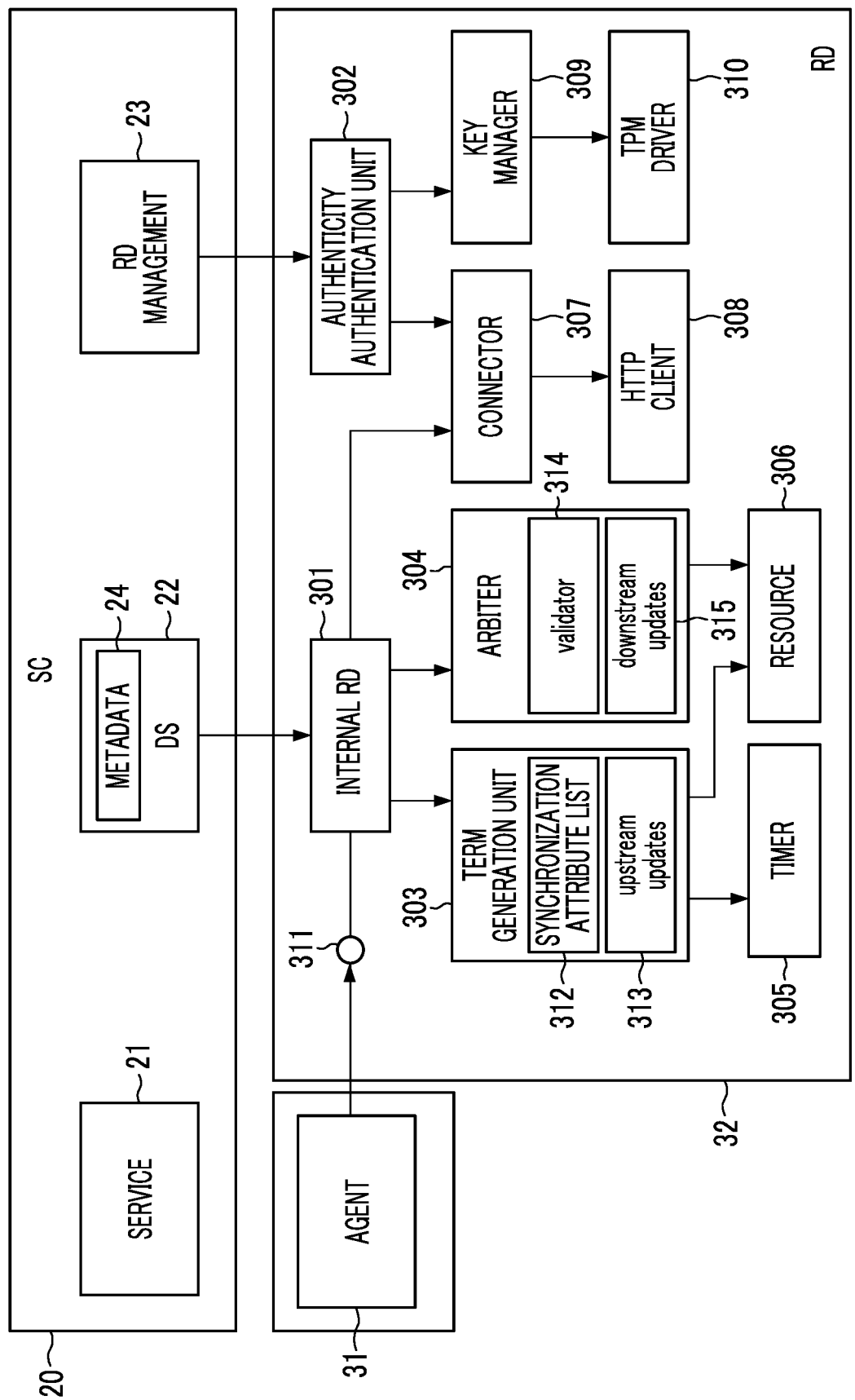
FIG. 3 is a diagram showing a configuration example of an RD.

Next, the configuration of the RD 32 will be described. FIG. 3 is a diagram showing a configuration example of the RD 32. The RD 32 includes an internal RD 301, an authenticity authentication unit 302, a term generation unit 303, an arbiter 304, a timer 305, a resource 306, a connector 307, an HTTP client 308, a key manager 309, a Trusted Platform Module (TPM) driver 310, and a core service IF 311.

The internal RD 301 performs a synchronization process of attribute data in cooperation with the term generation unit 303, the arbiter 304, and the connector 307.

The term generation unit 303 controls the start timing of the synchronization period in which the attribute data is synchronized with the SC 20, and manages information regarding each attribute data to be synchronized with the SC 20 and information about attribute items to be updated by a neighboring user operating the image forming apparatus 30.

Therefore, the term generation unit 303 includes a synchronization attribute list 312 and an upstream updates 313.

The synchronization attribute list 312 is a list in which synchronization target attribute items are defined, among the attribute items included in the image forming apparatus 30. Further, the upstream updates 313 is a buffer for temporarily storing information regarding the attribute item updated by a neighboring user operating the image forming apparatus 30 until the SC 20 and the attribute data are synchronized.

A timer 305 is connected to the term generation unit 303, and the timer 305 notifies the term generation unit 303 of a timeout each time a predetermined time elapses. The term generation unit 303 starts synchronization of attribute data, upon receiving a notification of a timeout from the timer 305. Further, a resource 306 that associates current values with all attribute items in the image forming apparatus 30 is connected to the term generation unit 303. The resource 306 updates the value of the attribute item for which the change instruction has been given.

On the other hand, the arbiter 304 checks whether the value of the attribute item, to which the change instruction has been given, follows a predetermined rule. Therefore, the arbiter 304 includes a validator 314 and downstream updates 315.

The validator 314 evaluates the validity of a value such as whether or not the value of the attribute item for which the change instruction is given is included in a predetermined regular range.

The downstream updates 315 is a buffer for temporarily storing the information regarding the updated attribute item until the SC 20 and the attribute data are synchronized.

The resource 306 is connected to the arbiter 304, and the arbiter 304 accesses the resource 306 to update the value of the attribute item to which the change instruction is given.

Further, the internal RD 301 is connected to the connector 307 in order to synchronize the attribute data with the SC 20. The connector 307 encodes data transmitted from the image forming apparatus 30 to the SC 20 (for example, notification data for notifying the DS 22 of the start of the synchronization period) into data in JSON format, for example, and transmits the encoded data to the DS 22 as an HTTP request through the HTTP client 308.

On the contrary, the HTTP client 308 receives the data transmitted by the DS 22 as a response to the HTTP request to the DS 22 and transfers the data to the internal RD 301.

Further, the RD 32 manages whether or not the connection-destination SC 20 is a regular SC 20 by the authenticity authentication unit 302.

Therefore, the key manager 309 and the connector 307 are connected to the authenticity authentication unit 302, and the key manager 309 generates a key pair, stores the generated key pair in the TPM driver 310, and transmits one of the generated keys to the RD management 23 via the connector 307. In a case where the key received from the image forming apparatus 30 matches the key registered in advance, the RD management 23 determines that the connection-destination image forming apparatus 30 is a regular image forming apparatus 30, and transmits a token to the authenticity authentication unit 302.

Hereinafter, the token that is transmitted from the RD management 23 to the authenticity authentication unit 302 is added to each data transmitted and received between the SC 20 and the image forming apparatus 30. With the token added to the data, the SC 20 and the image forming apparatus 30 can mutually determine whether or not the transmission source of the data is a regular partner that has been authenticated in advance.

In addition, each agent 31 and the RD 32 are connected to each other via the core service IF 311.

The SC 20 and the image forming apparatus 30 shown above can be configured by using the computer 40 and the computer 50, respectively.

Figure 4:
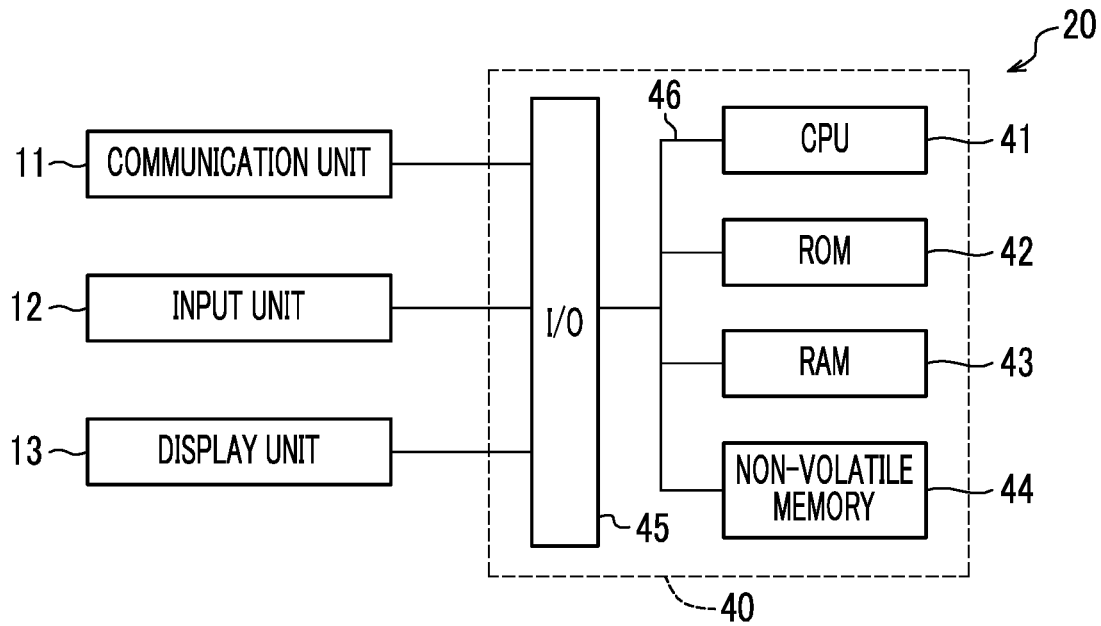
FIG. 4 is a diagram showing a configuration example of a main part of an electrical system of a computer constituting an SC.

FIG. 4 is a diagram showing a configuration example of a main part of an electrical system of a computer 40 constituting the SC 20.

The computer 40, which is an example of the second apparatus, includes a Central Processing Unit (CPU) 41 which is an example of a processor that is responsible for the process of each component of the SC 20 shown in FIG. 2, a Read Only Memory (ROM) 42 that stores a startup program (Basic Input Output System: BIOS) that performs the startup process of the computer 40, a Random Access Memory (RAM) 43 used as a temporary work area of the CPU 41, a non-volatile memory 44, and an input/output interface (I/O) 45. The CPU 41, the ROM 42, the RAM 43, the non-volatile memory 44, and the I/O 45 are connected to each other via a bus 46.

The non-volatile memory 44 is an example of a storage device that retains stored information even in a case where power supplied to the non-volatile memory 44 is cut off, and for example, a semiconductor memory is used, but a hard disk may be used. For example, data that needs to be continuously stored even in a case where the power of the computer 40 is cut off, such as the metadata 24, is stored in the non-volatile memory 44. Therefore, the non-volatile memory 44 stores, for example, an information processing program that causes the computer 40 to function as the SC 20.

For example, a communication unit 11, an input unit 12, and a display unit 13 are connected to the I/O 45.

The communication unit 11 is connected to the communication line 3 and includes a communication protocol for mutually performing data communication with the user terminal 10 and the image forming apparatus 30.

The input unit 12 is a unit that receives an operation of an administrator who manages a cloud service and notifies the CPU 41, and includes, for example, a button, a touch panel, a keyboard, a mouse, a pointing device, or the like.

The display unit 13 is an example of a unit that visually displays information processed by the CPU 41, and includes, for example, a liquid crystal display, an organic electro luminescence (EL) display, or the like.

Figure 5:
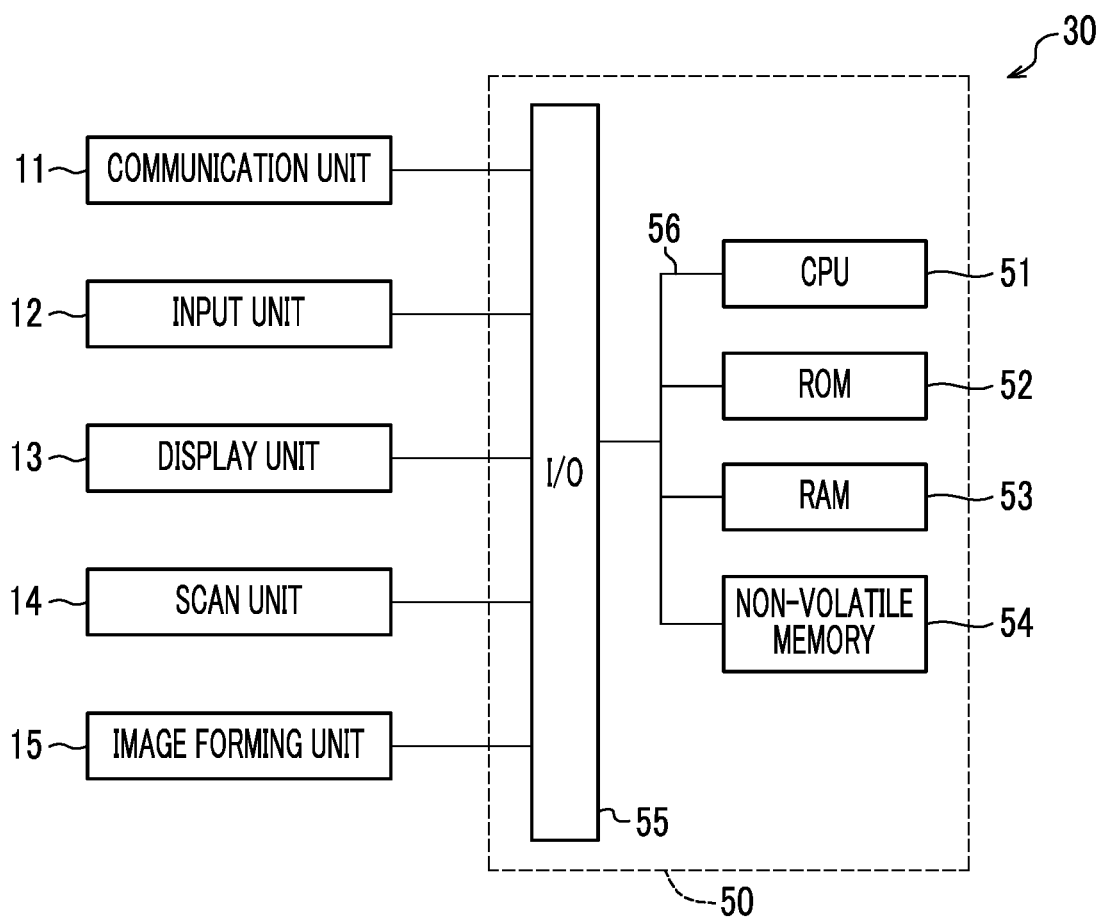
FIG. 5 is a diagram showing a configuration example of a main part of an electrical system of an image forming apparatus.

On the other hand, FIG. 5 is a diagram showing a configuration example of a main part of an electrical system of an image forming apparatus 30 configured by using the computer 50.

The computer 50 executes the process of each component of the image forming apparatus 30 shown in FIG. 2, and includes a CPU 51 that is an example of a processor that controls the system 33, a ROM 52 that stores the BIOS that performs the startup process of the computer 50, a RAM 53 used as a temporary work area of the CPU 51, a non-volatile memory 54, and an I/O 55. The CPU 51, the ROM 52, the RAM 53, the non-volatile memory 54, and the I/O 55 are connected to each other via a bus 56.

For example, data that needs to be continuously stored even in a case where the power of the image forming apparatus 30 is cut off, such as an image forming program that causes the resource 306 or the computer 50 to function as the image forming apparatus 30, is stored in the non-volatile memory 54.

For example, a communication unit 11, an input unit 12, a display unit 13, a scan unit 14, and an image forming unit 15 are connected to the I/O 55.

The scan unit 14 is a unit that scans the contents of a document transported on a transport document scanning glass (not shown) with an optical scanning device (not shown) and converts the contents into image data.

The image forming unit 15 is a unit that forms an image represented by image data on a paper medium by using a coloring material. The type of an image forming method in the image forming unit 15 is not limited, and an electrophotographic method or an inkjet method may be used.

As a matter of course, the units connected to the computer 40 and the computer 50 are not limited to the units shown in FIGS. 4 and 5. Necessary units can be selected and connected to the computer 40 and the computer 50.

Figure 6:
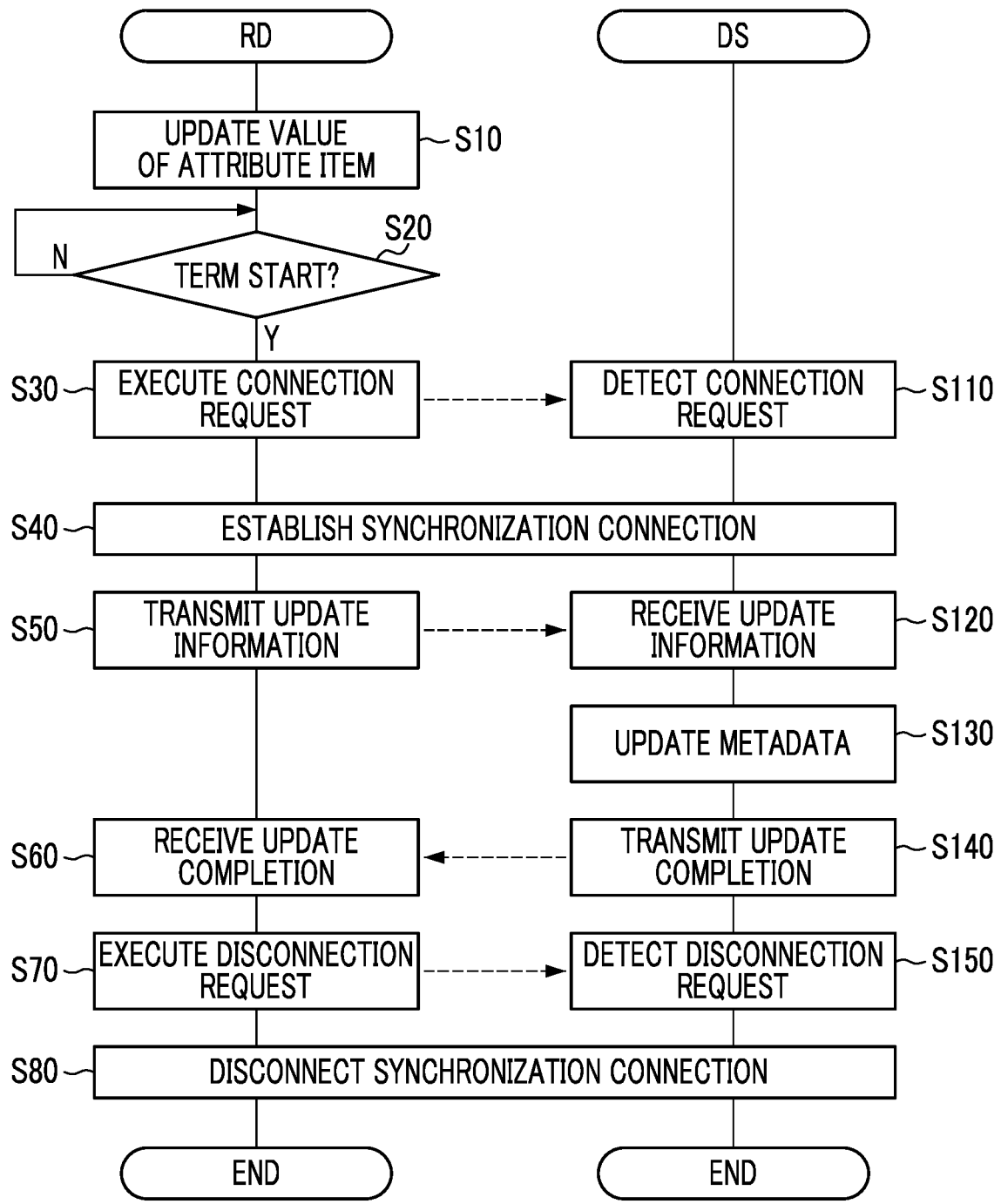
FIG. 6 is a flowchart showing an example of a flow of a synchronization process executed by a CPU of the image forming apparatus and a CPU of the computer constituting the SC, in a case where a neighboring user updates a value of an attribute.

Next, the synchronization process of the attribute data in the service providing system 1 will be described. FIG. 6 is a flowchart showing an example of a flow of a synchronization process executed by the CPU 51 of the image forming apparatus 30 and the CPU 41 of the computer 40 constituting the SC 20, in a case where a neighboring user operates the input unit 12 of the image forming apparatus 30 to give a change instruction to update a value of a synchronization target attribute item.

The image forming program of the image forming apparatus 30 that defines the synchronization process is stored in advance in, for example, the non-volatile memory 54 of the image forming apparatus 30. The CPU 51 of the image forming apparatus 30 reads the image forming program stored in the non-volatile memory 54 to execute the synchronization process. The image forming program is an example of an apparatus program that executes a function of the image forming apparatus 30.

Further, the server program of the computer 40 that defines the synchronization process is stored in advance in, for example, the non-volatile memory 44 of the computer 40. The CPU 41 of the computer 40 reads the server program stored in the non-volatile memory 44 to execute the synchronization process.

It is assumed that the authenticity of the RD 32 is ensured by the SC 20 before the synchronization process.

Figure 7:
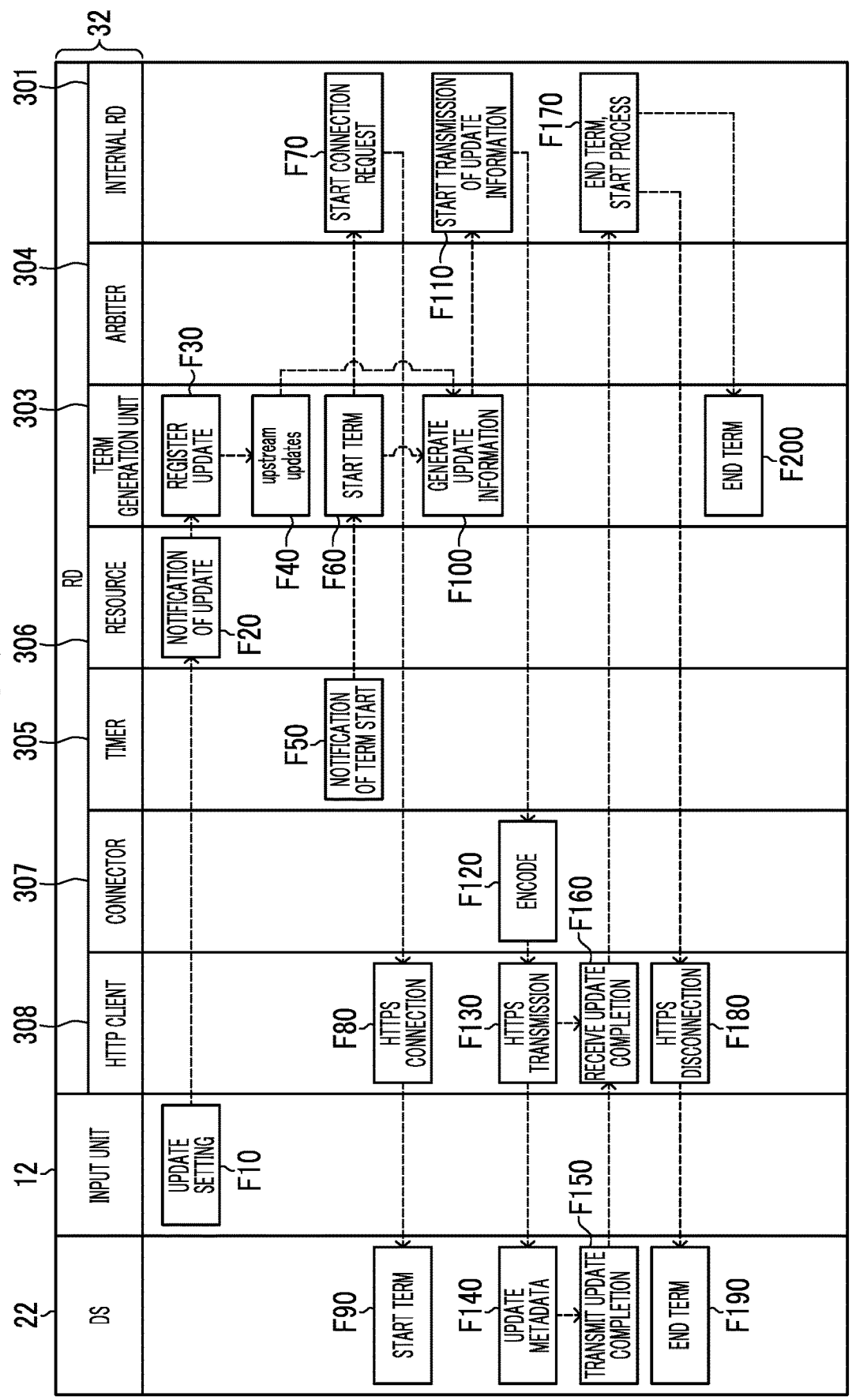
FIG. 7 is a sequence diagram illustrating an example of a data flow inside the RD in a case where a neighboring user updates a value of an attribute.

Here, in order to explain the flow of the synchronization process shown in FIG. 6 in a more understandable manner, the description will be made with reference to FIG. 7. FIG. 7 is a sequence diagram showing an example of a data flow inside the RD 32 shown in FIG. 3 in a case where the synchronization process shown in FIG. 6 is executed. The input unit 12 in FIG. 7 represents the input unit 12 of the image forming apparatus 30.

In a case where the neighboring user operates the input unit 12 of the image forming apparatus 30 to set the value of the synchronization target attribute item to a new value (FIG. 7: F10), the resource 306 updates the attribute item, of which value is to be changed, to a new value in step S10.

In a case where the value of the attribute item is updated, the resource 306 transmits an update notification to the term generation unit 303 to notify that the value of the attribute item has been updated (FIG. 7: F20).

Upon receiving the update notification, the term generation unit 303 registers that the update has been performed inside the term generation unit 303 (FIG. 7: F30), and stores the update identification information for uniquely identifying the updated attribute item and a new value after the update, that is, the set value and the time stamp in the upstream updates 313 in association with each other (FIG. 7: F40).

The time stamp is an example of time information representing a time in which a change instruction of a value of an attribute item is received from the input unit 12, and is associated with each updated attribute item.

In step S20 of FIG. 6, the term generation unit 303 determines whether or not the term has been started. The "term" represents a synchronization period of the attribute data between the SC 20 and the image forming apparatus 30, and the term generation unit 303 starts a term, upon receiving a time-out notification from the timer 305 that times out at each predetermined interval. Therefore, in a case where the time-out notification is not received from the timer 305, the term generation unit 303 determines that the next term has not been started yet, and monitors the time-out notification while repeatedly executing step S20. On the other hand, in a case where the time-out notification is received from the timer 305 (FIG. 7: F50), the term generation unit 303 determines that the term has started (FIG. 7: F60), and the process proceeds to step S30.

In a case where the term is started, the internal RD 301 makes a connection request to the DS 22 in order to connect the RD 32 and the DS 22 in step S30 (FIG. 7: F70). Specifically, the HTTP client 308 is notified of the connection request from the internal RD 301, and the HTTP client 308 starts the HTTPS connection (FIG. 7: F80).

On the other hand, in step S110, the DS 22 detects that the connection request has been made from the RD 32.

In accordance with the detection of the connection request, in step S40 of FIG. 6, the HTTP client 308 and the DS 22 execute a predetermined connection sequence to establish the link. The "link" is a communication channel constructed in the communication line 3. Hereinafter, the link connecting the DS 22 and the RD 32 will be referred to as a "synchronization connection".

The DS 22 knows that the term has started due to the establishment of the synchronization connection (FIG. 7: F90).

On the other hand, after the start of the term, the term generation unit 303 generates update information with reference to the information stored in the upstream updates 313 (FIG. 7: F100).

The update information is an example of attribute data including a value at the start of the term of each attribute item that has been updated after the previous term is started, among the synchronization target attribute items. The term generation unit 303 associates each of the attribute items of which values have been updated with a time stamp stored in upstream updates 313. Further, in order to manage which attribute item value is updated in which term, the term generation unit 303 adds the term identification information for uniquely identifying each term and the transmission start time of the update information to the update information.

Then, in step S50 of FIG. 6, the internal RD 301 transmits the generated update information to the DS 22 (FIG. 7: F110). In this case, the update information is encoded by the connector 307 (FIG. 7: F120), and the HTTP client 308 performs the HTTPS transmission (FIG. 7: F130).

On the other hand, in step S120 of FIG. 6, the DS 22 receives the update information from the RD 32.

In step S130, the DS 22 updates the value of the metadata 24 corresponding to the attribute item of which update is known by the update information received in step S120, among the attribute items included in the metadata 24 (FIG. 7: F140). Accordingly, the values of the respective synchronization target attribute items in the SC 20 and the image forming apparatus are set to the same value, and the image forming apparatus 30 reflecting the attribute data of the image forming apparatus 30 at the time of starting the term is formed on the cloud service.

Since the synchronization of the attribute data is ended as described above, in step S140, the DS 22 transmits, to the RD 32, an update completion indicating that the synchronization of the attribute data is ended (FIG. 7: F150).

On the other hand, in step S60 of FIG. 6, the HTTP client 308 receives the update completion (FIG. 7: F160), and notifies the internal RD 301 that the update completion is received from the DS 22.

In a case where the internal RD 301 receives the update completion, the internal RD 301 deletes the information regarding the updated attribute item stored in the upstream updates 313.

Further, since the synchronization of the attribute data is completed, in step S70, the internal RD 301 executes the term end process (FIG. 7: F170). Specifically, the internal RD 301 makes a disconnection request for the synchronization connection, the HTTP client 308 is notified of the disconnection request for the internal RD 301, and the HTTP client 308 starts the HTTPS disconnection (FIG. 7: F180).

On the other hand, in step S150 of FIG. 6, the DS 22 detects that the disconnection request is made from the RD 32.

In accordance with the detection of the disconnection request, in step S80 of FIG. 6, the HTTP client 308 and the DS 22 execute a predetermined disconnection sequence to disconnect the synchronization connection. The internal RD 301 and the DS 22 know that the term has ended due to the synchronization connection being disconnected (FIG. 7: F190 and F200). As described above, the synchronization process during one term shown in FIG. 6 is ended.

In a case where the value of at least one attribute item is updated during a term, the RD 32 does not perform the synchronization of the attribute data including the updated attribute item during the running term, but in the next term, performs the synchronization of the attribute data including the attribute item updated during the previous term.

Further, in a case where the synchronization of the attribute data fails because the synchronization connection cannot be established in step S40 of FIG. 6 due to a communication failure or the like, the RD 32 does not re-establish the synchronization connection by executing the connection request again during the identical term and ends the synchronization process. Therefore, the information of the attribute item that could not be synchronized remains in the upstream updates 313 without being deleted as it is.

Then, in the first term in which the synchronization connection is to be established next, the RD 32 transmits, to the DS 22, the update information of all the attribute items stored as it is in the upstream updates 313 without performing synchronization yet, and synchronizes the attribute data between the DS 22 and the RD 32.

Next, a synchronization process in a case where the value of the synchronization target attribute item is updated in the SC 20 will be described.

Figure 8:
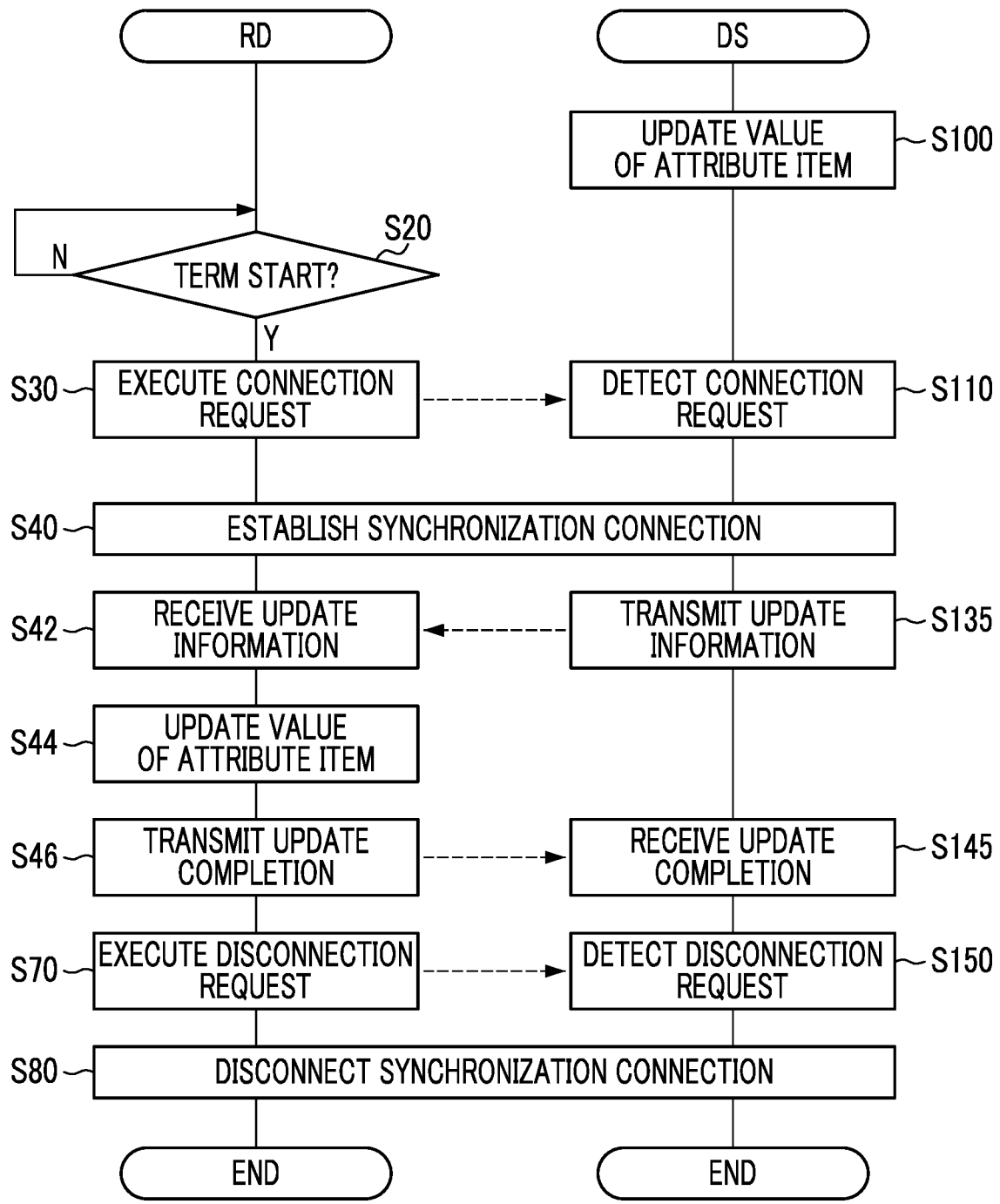
FIG. 8 is a flowchart showing an example of a flow of a synchronization process executed by a CPU of the image forming apparatus and a CPU of the computer constituting the SC, in a case where a remote user updates a value of an attribute.

FIG. 8 is a flowchart showing an example of a flow of a synchronization process executed by the CPU 51 of the image forming apparatus 30 and the CPU 41 of the computer 40 constituting the SC 20, in a case where a remote user gives a change instruction to update the value of the synchronization target attribute item, to the SC 20 from the user terminal 10.

The synchronization process shown in FIG. 8 is different from the synchronization process shown in FIG. 6 in that step S10 is deleted from the process of RD 32, step S100 is added to the process of the DS 22, steps S50 and S60 are replaced with steps S42, S44, and S46, and the processes of steps S120 to S140 are replaced with steps S135 and S145.

Note that the flow of data inside the RD 32 in the synchronization process in a case where the value of the synchronization target attribute item is updated in the SC 20 can be conceived from the sequence diagram shown in FIG. 7, and thus the illustration is omitted.

In a case where the remote user operates the user terminal 10 to give a change instruction to set the value of the synchronization target attribute item to the new value, the DS 22 updates the attribute item, of which value is to be changed, to a new value in step S100.

After that, in a case where the term is started in the RD 32, a synchronization connection is established between the DS 22 and the RD 32. Therefore, in step S135, the DS 22 transmits, to the RD 32, the update information of the updated attribute item until the term is started. In addition, the DS 22 adds a time stamp to each of the updated attribute items, and adds the term identification information and the transmission start time of the update information to the update information.

On the other hand, in step S42, the RD 32 receives the update information from the DS 22.

In step S44, the RD 32 updates the value of the attribute item of which update is known by the update information received in step S42 to the value designated in the update information. Accordingly, the value of the attribute item updated by the SC 20 is reflected in the attribute data of the image forming apparatus 30.

Since the synchronization of the attribute data is ended as described above, in step S46, the RD 32 transmits the update completion to the DS 22.

On the other hand, in step S145, the DS 22 receives the update completion and knows that the synchronization of the attribute data is completed on the RD 32 side.

Hereinafter, as described in the synchronization process of FIG. 6, the synchronization connection is disconnected by the RD 32 making a disconnection request for the synchronization connection, and the synchronization process shown in FIG. 8 ends in a case where one term ends.

Similar to the process of the RD 32, even in a case of receiving the change instruction from the user terminal 10 in the term, the DS 22 does not synchronize the attribute data including the attribute item updated by the change instruction during the running term, and synchronizes attribute data including attribute items updated during the previous term in the next term.

Further, in a case where the attribute data cannot be synchronized because the synchronization connection cannot be established in step S40 of FIG. 8 due to a communication failure or the like, the DS 22 synchronizes the attribute data in the next term. Therefore, the DS 22 does not delete but stores the updated attribute item information that could not be synchronized, and deletes the updated attribute item information after receiving the update completion in step S145.

Next, a synchronization process in a case where the value of the synchronization target attribute item is updated in both the SC 20 and the image forming apparatus 30 will be described.

Since the remote user and the neighboring user can individually update the value of the attribute item, different values may be set for the same attribute item. As described above, the difference in the contents of the instruction for changing the value of the attribute item respectively received by the SC 20 and the image forming apparatus 30 for the same attribute item or the occurrence of a contradictory situation by performing a process in response to an instruction are referred to as "conflicts".

Figure 9:
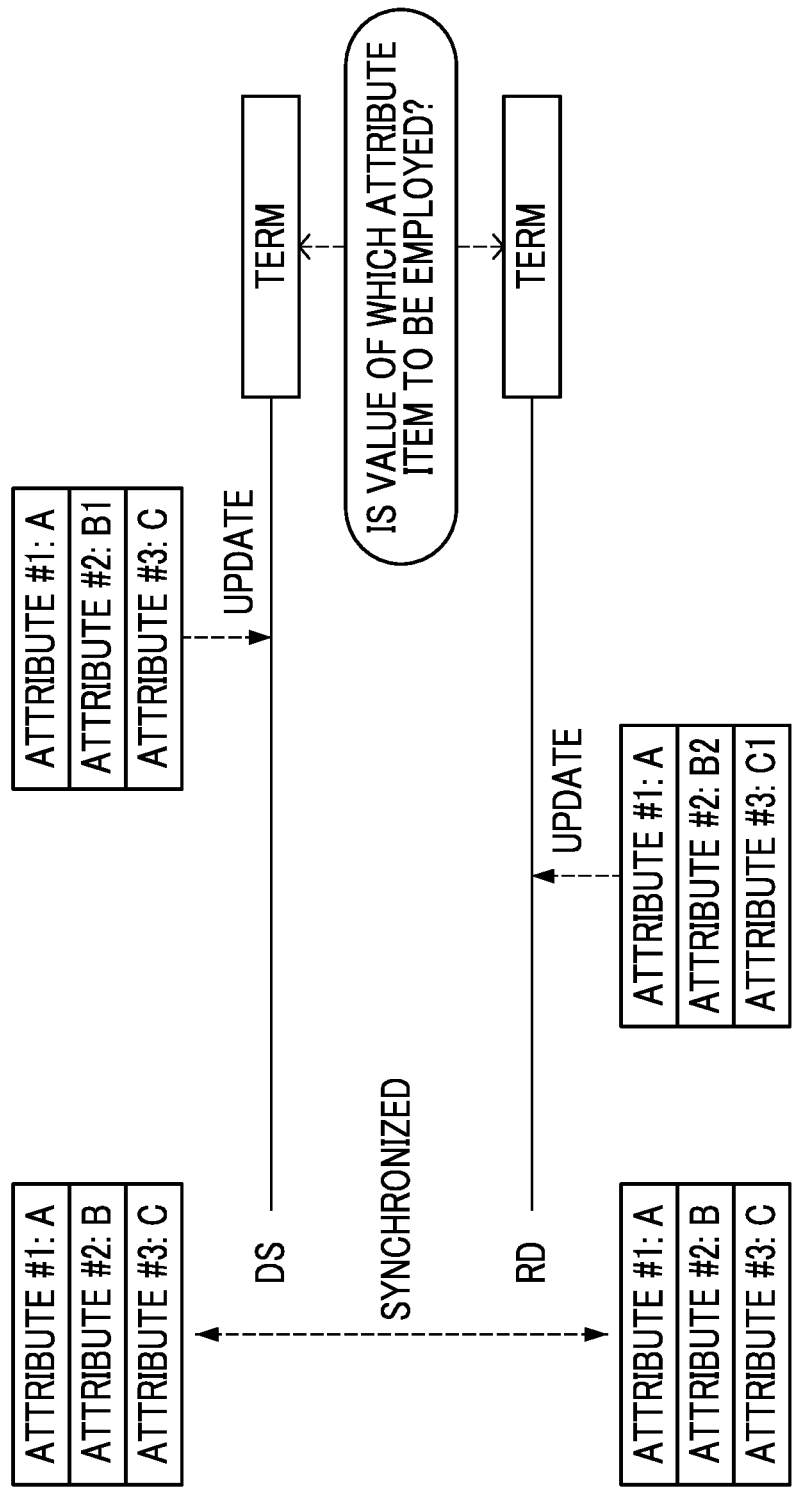
FIG. 9 is a diagram showing an example of occurrence of a conflict.

FIG. 9 is a diagram showing an example of occurrence of a conflict. For example, it is assumed that there are three synchronization target attribute items of attribute #1, attribute #2, and attribute #3, and the respective values are synchronized with "A", "B", and "C". Under such a state, in a case where the value of attribute #2 is updated to "B2" and the value of attribute #3 is updated to "C1" in the RD 32 before the start of the term, and then the value of attribute #2 is updated to "B1" in the DS 22, a problem arises which value out of the value updated by the DS 22 or the value updated by the RD 32 is to be employed as the value of attribute #2. Therefore, the synchronization process in a case where a conflict occurs will be described below.

Figure 10:
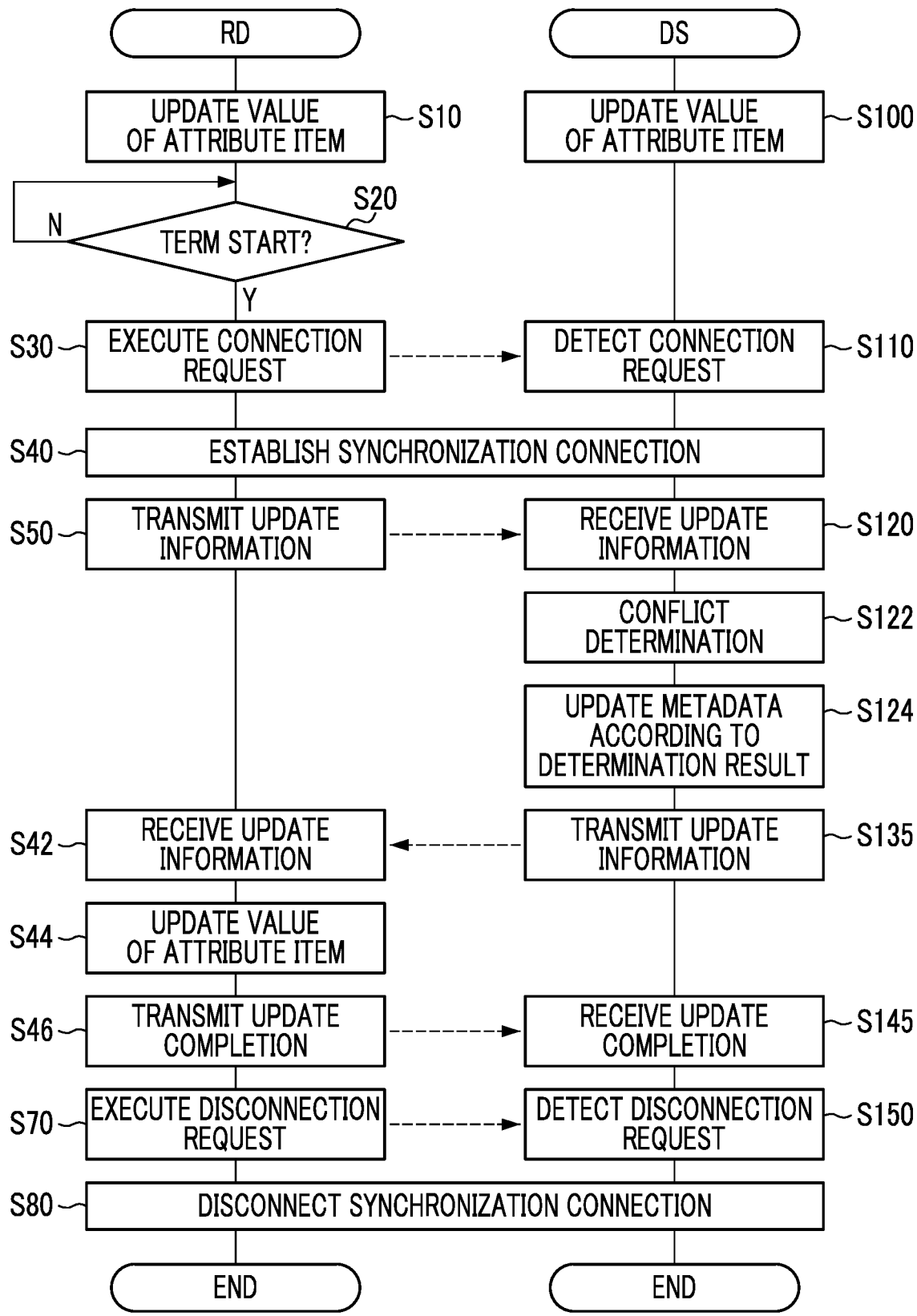
FIG. 10 is a flowchart showing an example of a flow of a synchronization process executed by a CPU of the image forming apparatus and a CPU of the computer constituting the SC, in a case where a conflict occurs.

FIG. 10 is a flowchart showing an example of a flow of the synchronization process executed by the CPU 51 of the image forming apparatus 30 and the CPU 41 of the computer 40 constituting the SC 20, in a case where a conflict occurs.

The synchronization process shown in FIG. 10 is different from the synchronization process shown in FIG. 8 in that steps S10 and S50 are added to the process of the RD 32, and steps S120, S122, and S124 are added to the process of the RD 32.

Figure 11A:
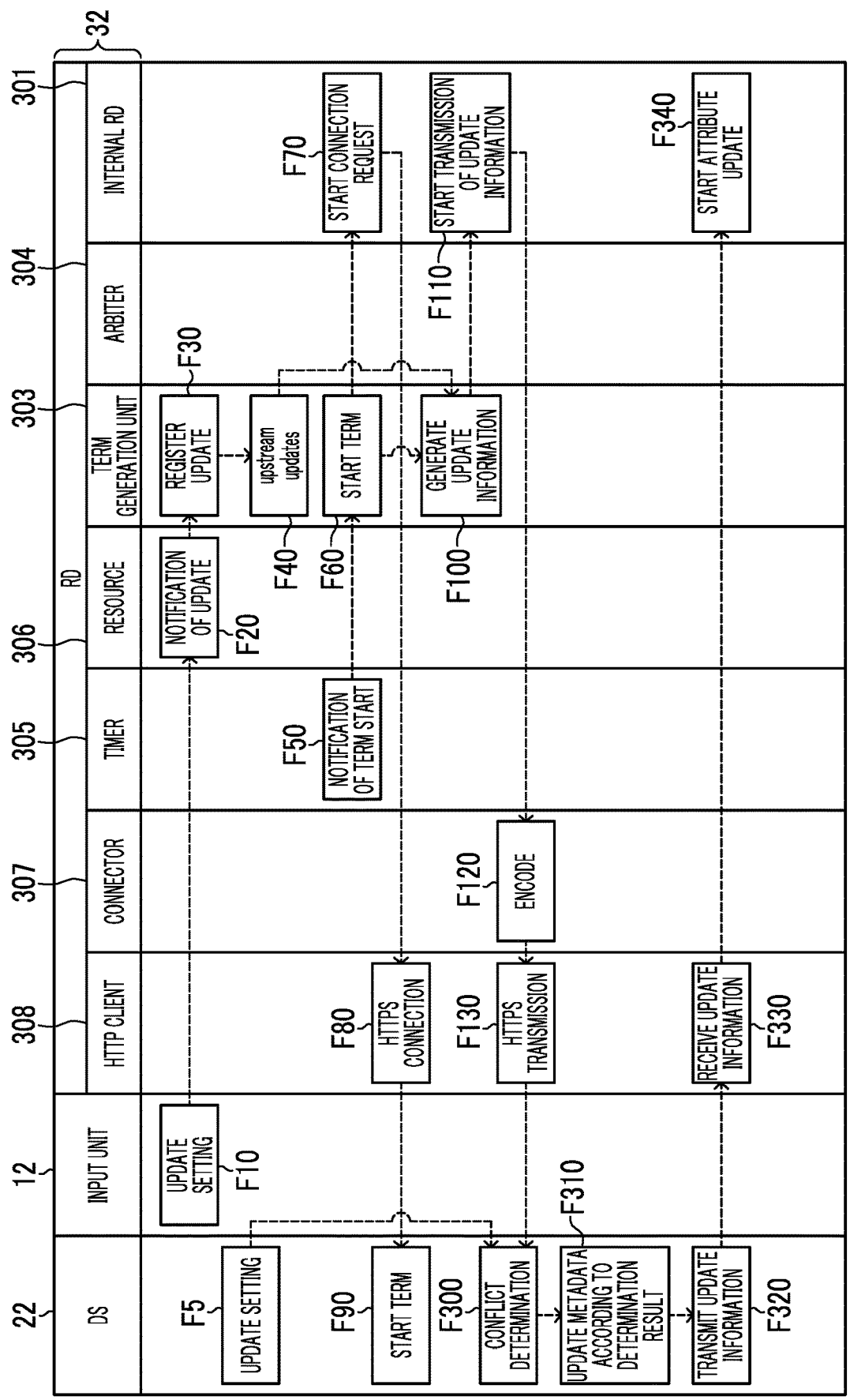
FIG. 11A is a sequence diagram illustrating an example of a data flow in the first half inside the RD in a case where a conflict occurs.
Figure 11B:
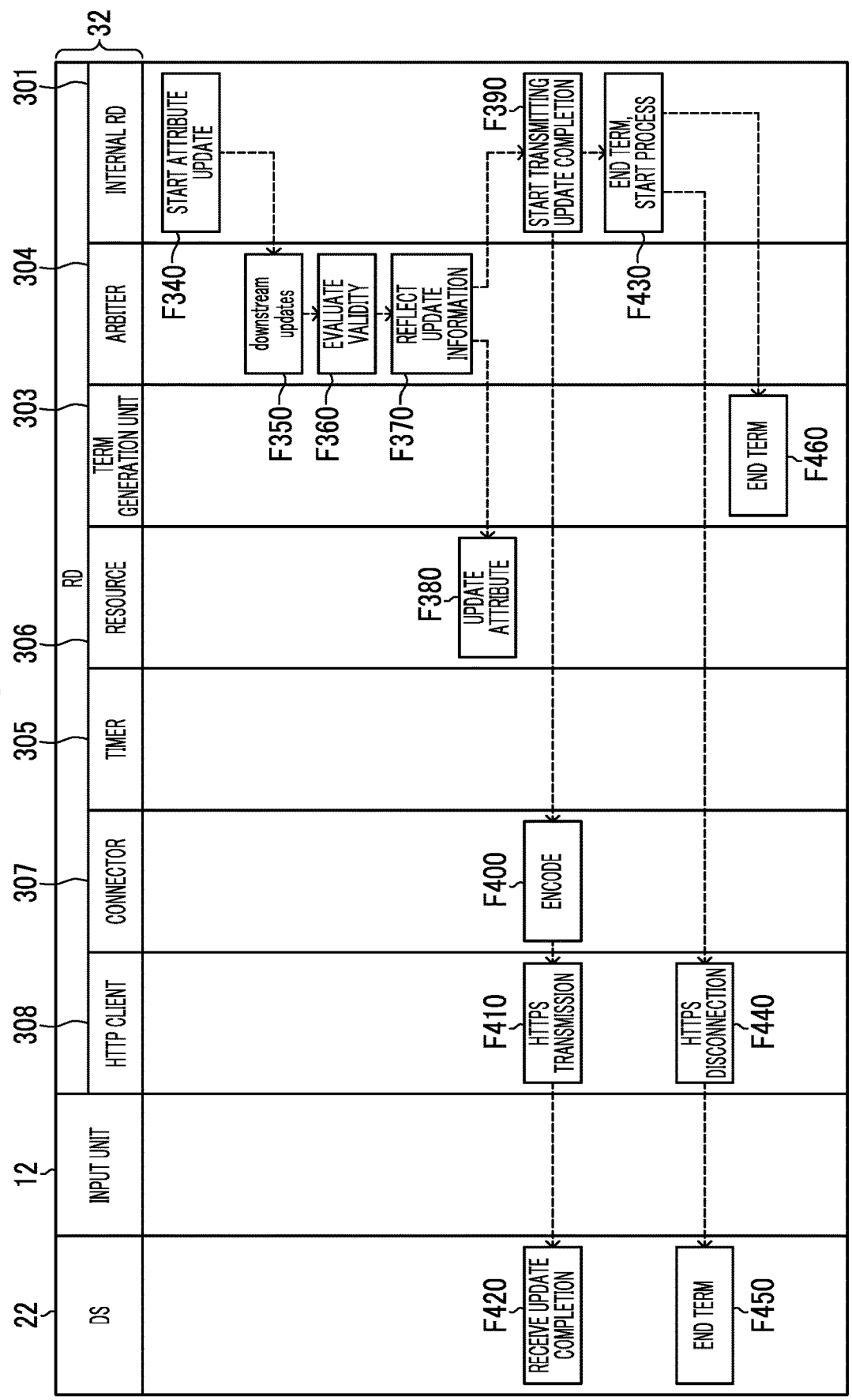
FIG. 11B is a sequence diagram illustrating an example of a data flow in the latter half inside the RD in a case where a conflict occurs.

Here, in order to explain the flow of the synchronization process shown in FIG. 10 in a more understandable manner, the description will be made with reference to FIGS. 11A and 11B. FIGS. 11A and 12B are sequence diagrams showing an example of a data flow inside the RD 32 shown in FIG. 3 in a case where the synchronization process shown in FIG. 10 is executed. The input unit 12 in FIGS. 11A and 11B represents the input unit 12 of the image forming apparatus 30. In addition, in FIG. 11A and FIG. 11B, the description of the parts already described with reference to FIG. 7 will be omitted.

In a case where the image forming apparatus 30 receives the instruction to change the value of the desired attribute item from the neighboring user, the resource 306 updates the attribute item, of which value is to be changed, to a new value in step S10.

Further, in a case where the SC 20 receives the instruction to change the value of the attribute item from the remote user via the user terminal 10, the DS 22 updates the attribute item, of which value is to be changed, to a new value in step S100.

As already described in the synchronization process of FIG. 6, when the term is started in the RD 32, a synchronization connection is established between the DS 22 and the RD 32, the DS 22 receives the update information from the RD 32 in step S120, and executes steps S122.

In step S122, the DS 22 executes a conflict determination for determining whether or not a conflict has occurred for each attribute item included in the update information received in step S120 (FIG. 11A: F300).

Thus, in the case of the example shown in FIG. 9, it is found that a conflict occurs in the attribute #2 and a conflict does not occur in the attribute #3.

Therefore, in step S124, the DS 22 updates the value of the attribute item in the metadata 24 according to the determination result (FIG. 11A: F310). Specifically, for the attribute item in which a conflict does not occur, the value of the attribute item is updated according to the update information received in step S120.

On the other hand, with respect to the attribute item in which a conflict occurs, the DS 22 determines which of the value updated by the DS 22 and the value updated by the RD 32 is to be set as the value of the attribute item, in accordance with the contents of the priority table 26 stored in advance in the non-volatile memory 44 of the computer 40, for example.

FIG. 12 is a diagram showing an example of the priority table 26. As shown in FIG. 12, in the priority table 26, a value that can be taken as an attribute item, and priority information representing which update information out of the update information according to the change instruction received from the user terminal 10 and the update information received from the RD 32 is to be prioritized are defined in advance for each attribute item.

In the case of the attribute item "Transport Layer Security (TLS) setting" in FIG. 12, it is shown that a value that can be taken by the "TLS setting" is "invalid" or "valid", and "DS priority", "RD priority", "time stamp", and "RD fixed" can be set as the priority information. The symbol "○" in the priority table 26 shown in FIG. 12 indicates that the item is set. Therefore, in the case of the attribute item "TLS setting" in FIG. 12, it shows a state where the current value is set to "valid" and the priority information is set to "DS priority".

In a case where the DS 22 determines that a conflict has occurred in the attribute item "TLS setting", the DS 22 refers to the priority information of the attribute item "TLS setting" in the priority table 26. In a case where "DS priority" is set in the priority information of the attribute item "TLS setting", the value of the attribute item "TLS setting" updated by the DS 22 is given priority.

In addition, in a case where "RD priority" is set in the priority information of the attribute item "TLS setting", the value of the attribute item "TLS setting" updated by the RD 32 is given priority. In a case where the "time stamp" is set in the priority information of the attribute item "TLS setting", among the value of the attribute item "TLS setting" updated by the DS 22 and the value of the attribute item "TLS setting" updated by the RD 32, the value to which the time stamp representing the relatively old time is associated, that is, the value of the "TLS setting" for which the change instruction is received earlier is prioritized.

In a case where "RD fixed" is set in the priority information of the attribute item "TLS setting", the remote user is prohibited from updating the value of the attribute item "TLS setting". That is, it represents an attribute item of which value can be changed only from the image forming apparatus 30. In a case where "DS fixed" is set in the priority information of the attribute item "TLS setting", the neighboring user is prohibited from updating the value of the attribute item "TLS setting" from the image forming apparatus 30. That is, it represents an attribute item of which value can be changed only from the user terminal 10.

In many cases, a network administrator who manages the service providing system 1 tends to perform work via the Internet 2. Therefore, it is preferable to set "DS priority" or "DS fixed" for the attribute item related to the network managed by the network administrator, such as an IP address, for example. This is because in a case where the IP address is set to be assigned by the DHCP server, a different IP address is assigned to each device connected to the LAN 5, but in a case where the IP address is changed or set by the image forming apparatus 30, there is a possibility that a problem that the same IP address may be set in the devices connected to the LAN 5.

Further, changes in hardware and replenishment of consumables in the image forming apparatus 30, such as addition of a finisher and replenishment of paper, cannot be performed via the Internet 2. Therefore, for example, it is preferable to set "RD fixed" for an attribute item representing a physical configuration or a physical state of the image forming apparatus 30.

As an example, in a case where the priority information is set to "DS priority" and "DS fixed" for an attribute item in which a conflict occurs, such as attribute #2 in FIG. 9, the value of attribute #2 is updated to "B1", and in a case where the priority information is set to "RD priority", "time stamp", and "RD fixed", the value of the attribute #2 is updated to "B2".

That is, for example, "RD priority" is the first setting, "DS priority" is the second setting, "time stamp" is the third setting, "DS fixed" is the fifth setting, and "RD fixed" is the sixth setting.

In addition, the priority information is not limited to the above example. For example, among the attribute item of which value is updated in the DS 22 and the attribute item of which value is updated in the RD 32, the attribute item with which the time stamp representing a relatively new time is associated, that is, priority information may be set to give priority to the value of the attribute item for which the change instruction is received late. The priority information for prioritizing the value of the attribute item for which the change instruction is lately received is an example of the fourth setting.

In a case where the value of the attribute item updated by the DS 22 is prioritized based on the priority information in the priority table 26 in this way, different values are set for the attribute item between the SC 20 and the image forming apparatus 30. For example, in the example of FIG. 9, in a case where the value of the attribute #2 is set to "B 1" through the conflict determination, the value of the attribute #2 in the SC 20 is "B1", and the value of the attribute #2 in the image forming apparatus 30 is "B2", and the synchronization is not achieved.

Therefore, in step S135 of FIG. 10, the DS 22 transmits, to the RD 32, the update information of the attribute item set to the value updated by the DS 22, among the conflicting attribute items (FIG. 11A: F320).

On the other hand, in step S42 of FIG. 10, the HTTP client 308 of the RD 32 receives the update information (FIG. 11A: F330), and notifies the internal RD 301 that the update information has been received from the DS 22. Upon receiving the notification of the reception of the update information, the internal RD 301 starts updating the attribute data in the image forming apparatus 30 (FIG. 11A: F340).

In step S44 of FIG. 10, the internal RD 301 stores the update information received in step S42 in the downstream updates 315 (see FIG. 3) (FIG. 11B: F350). In a case where the update information is stored in the downstream updates 315, the arbiter 304 evaluates the validity of the update information (FIG. 11B: F360), and in a case where the content of the update information is appropriate, the arbiter 304 updates the value of the attribute item that is transmitted by the update information in the resource 306 to the value transmitted by the update information (FIG. 11B: F370 and F380).

In step S44, the attribute data stored in the SC 20 and the image forming apparatus 30 are synchronized with each other. Therefore, in step S46, the internal RD 301 transmits the update completion to the DS 22 (FIG. 11B: F390). The update completion is encoded by the connector 307 (FIG. 11B: F400), and the HTTP client 308 transmits the HTTPS to the DS 22 (FIG. 11B: F410).

On the other hand, in step S145 of FIG. 10, the DS 22 receives the update completion from the RD 32. After that, the same process as the process from step S70 of the synchronization process shown in FIG. 6 is performed to disconnect the synchronization connection, and the synchronization process shown in FIG. 10 is ended. Since the sequences of F430 to F460 in FIG. 11B are the same as the sequences of F170 to F200 in FIG. 7, the description thereof will be omitted.

As described above, according to the service providing system 1 according to the present exemplary embodiment, in a case where a conflict occurs in synchronizing the attribute data between the SC 20 and the image forming apparatus 30, a synchronization process is performed to specify which value among the value of the attribute item updated by the DS 22 and the value of the attribute item updated by the RD 32 has priority, according to the content of the priority information defined in the priority table 26, and set the conflicting values of the attribute item to the value of the attribute item with priority.

In the above description, an example in which the values of the attribute item updated by the DS 22 and the RD 32 are synchronized in the term to be started next is described, but the synchronization timing of the attribute data is not limited to this. For example, the DS 22 and the RD 32 may be adjusted to perform synchronization at a different timing for each attribute item, according to the characteristics of the attribute items.

FIG. 13 is a diagram showing an example in which each attribute item managed by the DS 22 and the RD 32 is classified for each update priority.

As shown in FIG. 13, each attribute item is classified into, for example, update priorities of priority 1, priority 2, and priority 3.

Among these, the attribute items belonging to the priority 1 are attribute items for performing synchronization in the next term executed after the update is performed, as described above. The attribute items belonging to priority 2 are attribute items for performing synchronization in the next term executed after restarting the computer 40 constituting the SC or the image forming apparatus 30. The attribute items belonging to the priority 3 are attribute items for performing synchronization in the next term executed after a time point at which the synchronization instruction is received or after a date and time designated in advance has elapsed.

The priority 1 includes attribute items that need to notify the other party as soon as possible that a value has been updated, between the SC 20 and the image forming apparatus 30, such as an IP address and a remaining amount of toner. The priority 2 includes attribute items that need to be temporarily powered off and then powered on again to change state, such as addition of a finisher and addition of a network card. The priority 3 includes attribute items that are required after work for which a predetermined date and time or period is predetermined, such as a job log or a change in an authentication mode.

Although the synchronization process of the service providing system 1 has been described so far, it is not necessary to set all the attribute items in the image forming apparatus as the synchronization target attribute items. For example, as the data size of the attribute item increases, the time and load required for synchronization increase, which may impose a burden on at least one of the CPU 41 of the computer 40 or the CPU 51 of the image forming apparatus 30. Therefore, in a case where the values of a plurality of attribute items having data sized being equal to or larger than a defined size determined in advance as a value that imposes a burden on at least one of the CPU 41 of the computer 40 or the CPU 51 of the image forming apparatus 30 are updated, and each attribute item is synchronized in the same term, it is conceivable that the load in the term temporarily increases, which affects other processes.

Therefore, the attribute item of which data size is equal to or larger than the defined size may not be set as the synchronization target attribute item, and the value may be updated individually regardless of the synchronization process in each term.

Hereinafter, a flow in a case where a remote user executes the function of the image forming apparatus 30 will be described by taking a setting function of individually setting a value of an attribute item from the user terminal 10 as an example.

Figure 14:
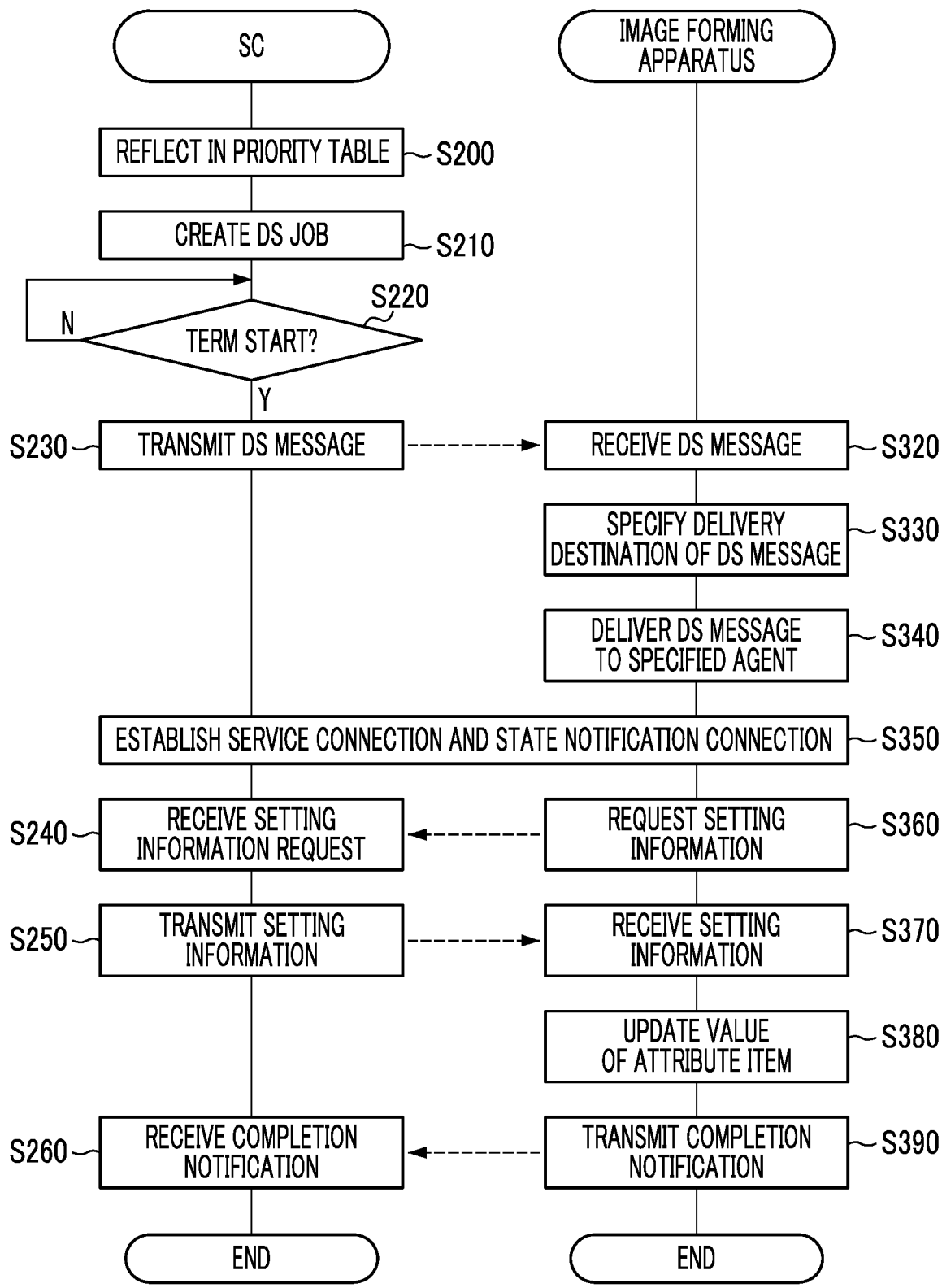
FIG. 14 is a flowchart showing an example of a flow of a setting process executed by a CPU of the image forming apparatus and a CPU of the computer constituting the SC, in a case where a remote user sets a value of an attribute.

FIG. 14 is a flowchart showing an example of a flow of the setting process executed by the CPU 51 of the image forming apparatus 30 and the CPU 41 of the computer 40 constituting the SC 20, in a case where a remote user operates the user terminal 10 to give a setting instruction to set a value of an attribute item. The setting process of setting a value in the attribute item is an example of a function of the image forming apparatus 30.

The image forming program of the image forming apparatus 30 that defines the setting process is stored in advance in, for example, the non-volatile memory 54 of the image forming apparatus 30. The CPU 51 of the image forming apparatus 30 reads the image forming program stored in the non-volatile memory 54 to execute the setting process.

Further, the server program of the computer 40 that defines the setting process is stored in advance in, for example, the non-volatile memory 44 of the computer 40.

The CPU 41 of the computer 40 reads the server program stored in the non-volatile memory 44 to execute the setting process.

In order to facilitate understanding of the flow of data in the setting process, the description will be made with reference to FIG. 15 as appropriate. Further, since the operation of the functional block inside the RD 32 has already been described with reference to FIGS. 7, 11A, and 11B, the operation of the functional block constituting the RD 32 will be described below as an operation of the RD 32 as a main body.

Figure 15:
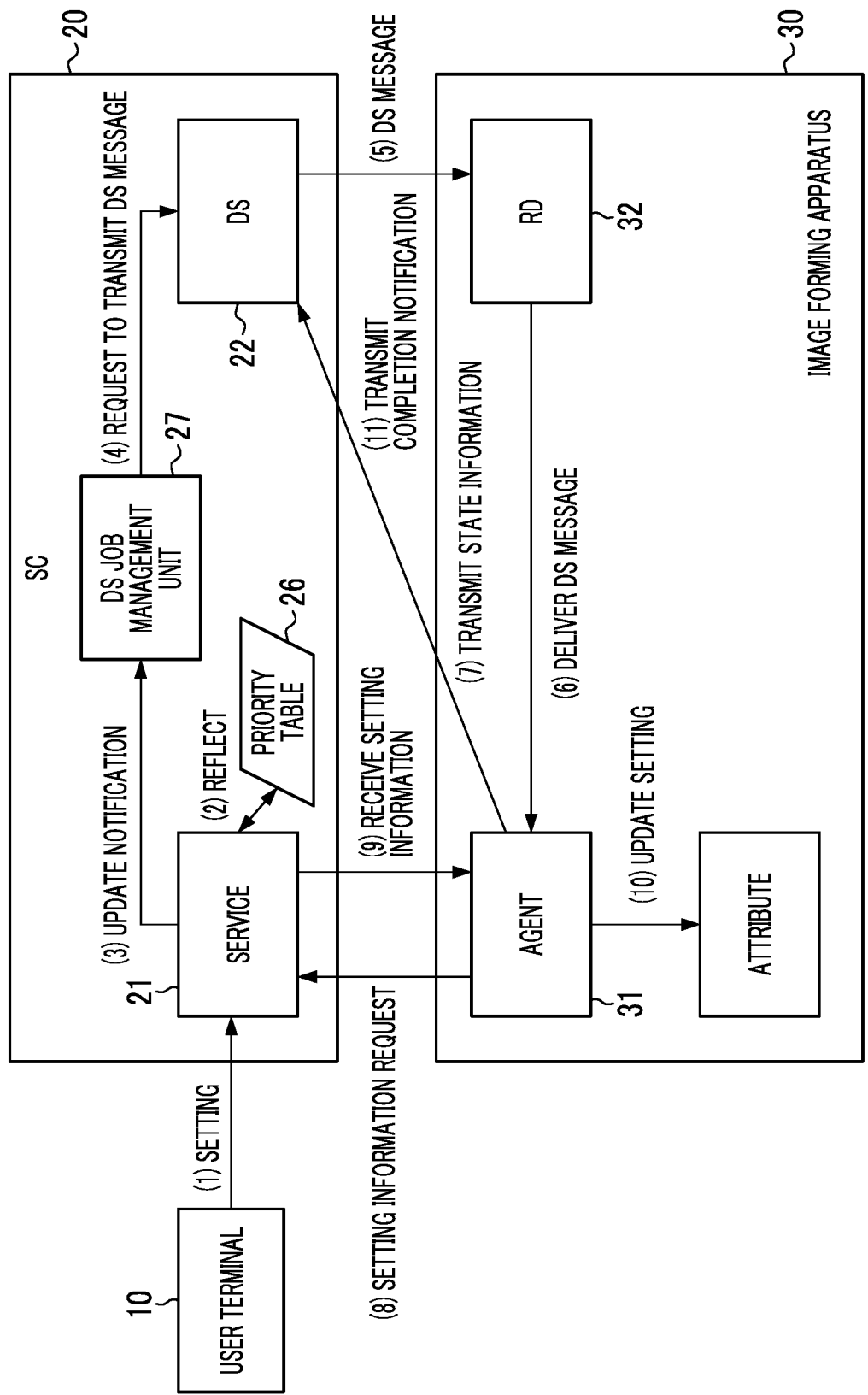
FIG. 15 is a sequence diagram illustrating an example of a data flow in the setting process starting from a remote user.

In step S200 of FIG. 14, the service 21 that has received an instruction to set a value of a desired attribute item from the user terminal 10 (FIG. 15: (1)) reflects the set value of the attribute item instructed by the setting instruction in the priority table 26 (FIG. 15: (2)). For example, in a case where the setting instruction for setting the value of the attribute item "TLS setting" to "valid" and "DS priority" is received, the service 21 sets the value of "TLS setting" to "valid" and sets the priority information to "DS Priority", in the priority table 26 shown in FIG. 12.

After that, the service 21 notifies the DS job management unit 27 that the priority table 26 is updated, together with the information for specifying the agent that executes the function instructed from the user terminal 10 in the image forming apparatus 30 in cooperation with the service 21, that is, the agent identification information (FIG. 15: (3)).

In step S210, the DS job management unit 27 creates the DS job in response to the update notification of the priority table 26 from the service 21. The DS job is information representing the instructed contents, and is managed by the DS job management unit 27. That is, every time an instruction is received from the user terminal 10, a DS job is generated by the DS job management unit 27, and each DS job is associated with a job number that identifies the DS job. The job number is an example of identification information that identifies the instruction. Then, the DS job management unit 27 refers to the DS job, and makes a transmission request of a message for notifying the RD 32 that some instruction (in this case, an instruction to set a value of an attribute item) has been given to the DS 22 from the user terminal 10 (FIG. 15: (4)). Thus, the message is registered in the DS 22. Hereinafter, a message that the DS 22 notifies the RD 32 of the reception of the execution request of the function of the image forming apparatus 30, such as an instruction to set a value of an attribute item, is referred to as a DS message.

In addition, access information necessary for connection to the service 21 that has received an instruction by the user terminal 10 from the agent 31, identification information of an agent transmitted from the service 21, and the job number of the DS job that makes a request for transmission of the DS message are added to the DS message by the DS 22. For the access information which is an example of the connection information, for example, a URL which is the place information for specifying the service 21 is used. Further, the access information which is an example of the connection information may include, for example, an access token which is the connection permission information for permitting access, issued by the service 21.

In the image forming apparatus 30, in order to set the attribute item, which is the target of the setting instruction, to the instructed value, the DS 22 transmits the created DS message to the RD 32. However, as shown in FIG. 1, since the firewall 4 is installed in the communication line 3 connecting the SC 20 and the image forming apparatus 30, a DS message is transmitted from the DS 22 to the RD 32 in the form of a response to the request of the RD 32. That is, the DS 22 and the RD 32 perform polling communication with the RD 32 as a starting point.

Since the synchronization process is performed between the DS 22 and the RD 32 through a synchronization connection at predetermined intervals, the RD 32 performs a polling to check whether there is a DS message during the term period. In a case where the DS 22 transmits a DS message as a response, the RD 32 can acquire the DS message.

Therefore, in step S220 of FIG. 14, the DS 22 determines whether or not the term has been started. In a case where the term is not started, the process of step S220 is repeatedly executed to monitor that the term is started. In a case where the term is started, the process proceeds to step S230.

During the term, polling is performed from the RD 32 to check whether there is a DS message through a synchronization connection. Therefore, in step S230, the DS 22 transmits the registered DS message to the RD 32 as a response to the polling from the RD 32 (FIG. 15: (5)). The synchronization connection in which the DS message is transmitted is an example of the first connection.

On the other hand, in step S320, the RD 32 receives the DS message from the DS 22.

In a case where the agent identification information is added to the DS message, in step S330, the RD 32 specifies the agent 31 represented by the agent identification information as the delivery destination of the DS message acquired from the DS 22.

In step S340, the RD 32 delivers the DS message acquired from the DS 22, to the agent 31 specified in step S330 (FIG. 15: (6)). In the example of the present exemplary embodiment, the RD 32 delivers the DS message to the agent 31 that sets the attributes related to the network.

In step S350, the agent 31 that has received the DS message refers to the access information added to the DS message and connects to the other party of the URL represented by the access information through the Internet 2. In this case, the agent 31 may transmit an access token to the service 21 included in the DS message. Accordingly, the service 21 that receives the function execution instruction from the user terminal 10 and the agent 31 that executes the instructed function in the image forming apparatus 30 are connected to each other. The link connecting the service 21 and the agent 31 in this way is referred to as a "service connection". The service connection is an example of a second connection, and by setting a port for bidirectional communication in the firewall 4, bidirectional communication capable of transmitting data from both the service 21 and the agent 31 at any timing is performed.

Further, in a case where the agent 31 connects to the service 21 based on the received DS message, the agent 31 establishes a link connecting the agent 31 itself and the DS 22 in order to notify the DS job corresponding to the DS message of the processing state. The link connecting the agent 31 and the DS 22 in this way is referred to as a "state notification connection". The state notification connection is an example of a third connection, and is unidirectional communication in which data transmission is permitted only in a direction from the agent 31 to the DS 22 by setting the firewall 4. However, the state notification connection may be bidirectional communication by setting the firewall 4. The agent 31 may specify the connection-destination DS 22, by referring to the URL of the DS 22 stored in the non-volatile memory 54 in advance. Here, the agent 31 notifies the DS 22 of the state information that "the connection with the service 21 has been established" via the link of the state notification connection (FIG. 15: (7)). In this case, the agent 31 adds the job number added to the DS message received by the agent 31 to the state information.

In step S360, the agent 31 requests the service 21 connected by the service connection to provide setting information including information on which attribute item is set to what value by the remote user using the user terminal 10 (FIG. 15: (8)).

On the other hand, in step S240, the service 21 receives the request for the setting information, and in step S250, the service 21 transmits the setting information to the agent 31 connected by the service connection, that is, the request source for the setting information (FIG. 15: (9)).

In a case where the agent 31 receives the setting information in step S370, the value of the attribute item is updated based on the content of the received setting information, in step S380. Accordingly, the value of the attribute item "TLS setting" in the image forming apparatus 30 is set to "valid" and "DS priority" (FIG. 15: (10)).

Since the process instructed by the DS message (in this case, the setting of the attribute item) has ended, in step S390, the agent 31 transmits a completion notification for notifying the completion of the process instructed by the DS message to the DS 22 connected by the state notification connection (FIG. 15: (11)). In this case, the agent 31 adds the job number added to the DS message received by the agent 31 to the completion notification.

In step S260, the DS 22 receives the completion notification, and notifies the DS job management unit 27 of the completion notification. It is assumed that the DS job management unit 27 that has received the completion notification has completed the DS job associated with the job number added to the completion notification. Thus, the setting process shown in FIG. 14 ends.

As described above, according to the service providing system 1 according to the present exemplary embodiment, in a case where the user terminal 10 executes the function of the image forming apparatus 30, a function execution instruction is received from the user terminal 10 through the service 21, and the DS 22 transmits to the RD 32 via a synchronization connection by a DS message that the function execution instruction is received from the user terminal 10. Upon receiving the DS message, the RD 32 delivers the DS message to the agent 31 that executes the function received by the service 21 in cooperation with the service 21, and the agent 31 that receives the DS message inquires of the service 21 that receives the function execution instruction about the contents of execution through the service connection, and executes the instructed function according to the execution content acquired from the service 21. The agent 31 notifies the DS 22 of the processing state through the state notification connection. Therefore, the process requested by the remote user through the service 21 is executed by the image forming apparatus 30.

FIG. 14 illustrates a setting process in a case where a remote user operates the user terminal 10 to give a setting instruction to set a value of an attribute item in the image forming apparatus 30, but a neighboring user may set the value of an attribute item from the image forming apparatus 30.

Therefore, next, a flow in a case where a neighboring user executes the function of the image forming apparatus 30 will be described by taking a setting function of setting a value of an attribute item from the image forming apparatus 30 as an example. Specifically, an example in which the value of the attribute item set from the image forming apparatus 30 conflicts with the SC 20 will be described.

Figure 16:
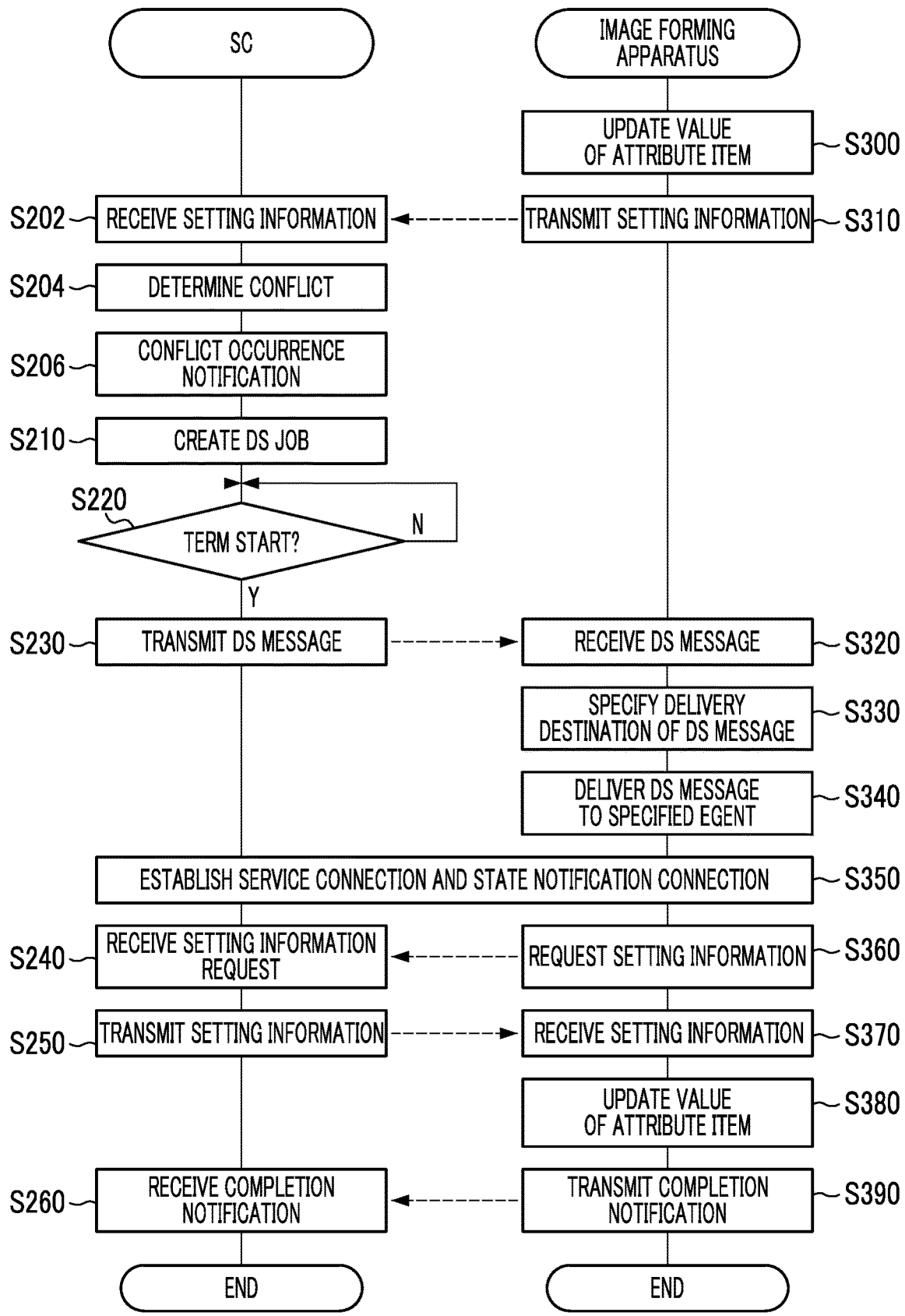
FIG. 16 is a flowchart showing an example of a flow of a setting process executed by a CPU of the image forming apparatus and a CPU of the computer constituting the SC, in a case where a neighboring user sets a value of an attribute.

FIG. 16 is a flowchart showing an example of a flow of the setting process executed by the CPU 51 of the image forming apparatus 30 and the CPU 41 of the computer 40 constituting the SC 20, in a case where a neighboring user operates the image forming apparatus 30 to give a setting instruction to set a value of an attribute item for which the set value needs to be checked, among the attribute items of the image forming apparatus 30.

In order to facilitate understanding of the flow of data in the setting process, the description will be made with reference to FIG. 17 as appropriate. Further, since the operation of the functional block inside the RD 32 has already been described with reference to FIGS. 7, 11A, and 11B, the operation of the functional block constituting the RD 32 will be described as an operation of the RD 32 as a main body, even in the example of the setting process shown in FIG. 16. It is assumed that a "service connection" has already been established between the agent 31 and the service 21.

Figure 17:
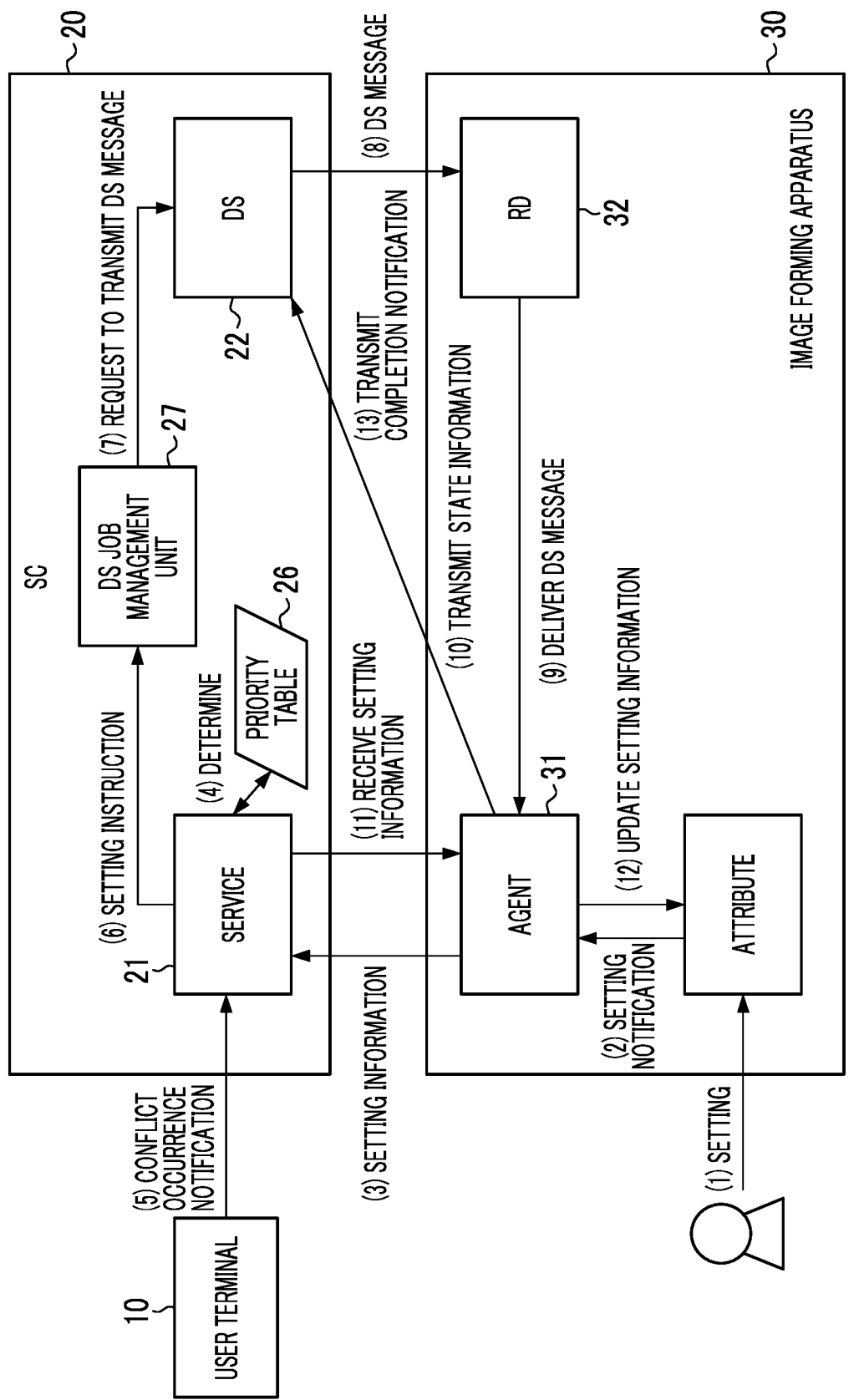
FIG. 17 is a sequence diagram illustrating an example of a data flow in the setting process starting from a neighboring user.

In step S300 of FIG. 16, in a case where the value of the attribute item is set by the neighboring user (FIG. 17: (1)), the system 33 updates the value of the attribute item to the set value. In a case where the value of the attribute item is set, the agent 31 in charge of the value setting function detects that the value has been set for the attribute item (FIG. 17: (2)), and generates setting information including information about which attribute items have been set to what values by the neighboring user. As a matter of course, the setting of the value of the attribute item includes a form of changing the value of the attribute item.

In step S310, the agent 31 transmits the setting information to the service 21 through the service connection established between the agent 31 and the service 21 that provides the service to the remote user in cooperation with the function of the image forming apparatus 30 together with the agent 31. An agent identification number of the agent 31 that has transmitted the setting information is added to the setting information transmitted from the agent 31. In addition, in a case where the service connection is not established, the agent 31 establishes the service connection with the service 21 that receives an instruction to set the value of the attribute item from the user terminal 10. As the URL of the service 21 associated with each agent 31, for example, a URL preset by the network administrator or a URL instructed by the network administrator each time a service connection is established may be used. In a case where the agent 31 has established a service connection with the service 21 in the past, for example, a URL stored in the non-volatile memory 54 may be used as history information.

On the other hand, in step S202, the service 21 receives the setting information from the agent 31. The service 21 that has received the setting information refers to the priority table 26 for the value of the attribute item represented by the setting information.

As an example, while the value of the attribute item "TLS setting" in the metadata 24 is "valid", it is assumed that the setting information includes information for setting the value of the "TLS setting" to "invalid". On the other hand, with reference to the priority table 26, for example, it is assumed that "DS fixed" is set for the priority information of the attribute item "TLS setting". In this case, the neighboring user is prohibited from setting the value of the attribute item, and a conflict with a high priority occurs. Further, referring to the classification into the update priorities shown in FIG. 13, it can be seen that the "TLS setting" is "priority 1: [set in the next term]".

As described above, in step S204, the service 21 executes a conflict determination for determining whether or not a conflict has occurred with respect to the setting information received from the agent 31 (FIG. 17: (4)). In a case where the conflict is detected, in step S206, the service 21 transmits a conflict occurrence notification for notifying the occurrence of the conflict and the priority of the attribute item in which the conflict has occurred, to the user terminal 10 used by the network administrator over the Internet 2. Accordingly, the network administrator can know that the operation not permitted by the service providing system 1 has been performed. In the case of the above example, the service 21 makes a notification that the "TLS setting", which is an example of the attribute item in the image forming apparatus 30, is changed to "invalid" on the image forming apparatus 30 side, and the conflicting attribute item has a high priority and needs to be dealt immediately.

In a case where a conflict occurs in which the metadata managed by the SC 20 and the value of the attribute item of the image forming apparatus 30 are in a mismatched state, the service 21 needs to execute a process of setting the value of the attribute item in the image forming apparatus 30 in which the conflict has occurred to a correct value. In the above example, although the value of the attribute item "TLS setting" in the image forming apparatus 30 is set to "invalid", the value of the attribute item "TLS setting" in the metadata managed by the SC 20 is remains "valid", so that it is necessary to set the value of the attribute item "TLS setting" in the image forming apparatus 30 to "invalid".

Therefore, in step S210, the DS job management unit 27 creates a DS job that sets the value of the designated attribute item in response to the setting instruction from the service 21 (FIG. 15: (6)). Then, the DS job management unit 27 requests the DS 22 to transmit a DS message notifying the RD 32 that there is an instruction to set a value of the attribute item (FIG. 17: (7)).

In step S220, the DS 22 determines whether or not the term has been started. In a case where the term is not started, the process of step S220 is repeatedly executed to monitor that the term is started. In a case where the term is started, the process proceeds to step S230.

In step S230, the DS 22 transmits the registered DS message to the RD 32 as a response to the polling from the RD 32 (FIG. 17: (8)).

The agent identification information of the agent 31 that has transmitted the setting information and the job number of the DS job that has requested the transmission of the DS message may be added to the DS message transmitted from the DS 22 to the RD 32.

On the other hand, the RD 32 executes the processes described in steps S320 to S340 of FIG. 14, and delivers the DS message to the agent 31 that has detected that the operation for setting the value of the attribute item has been performed (FIG. 17: (9)).

The agent 31 that has received the DS message executes the processes described in steps S350 to S380 of FIG. 14, notifies the DS job of the process state through the state notification connection established with the DS 22 (FIG. 17: (10)), acquires from the service 21, the setting information of the attribute item in which the conflict has occurred through the service connection established with the service 21, and updates the value of the attribute item of the image forming apparatus 30, based on the setting information (FIG. 17: (11) and (12)). Further, the agent 31 that has ended the instructed process executes the process described in step S390 in FIG. 14 and transmits a completion notification to the DS 22 (FIG. 17: (13)).

Therefore, the value of "TLS setting" that is the attribute item set to "invalid" in the image forming apparatus 30 is returned to "valid", and the value of the attribute item "TLS setting" in the metadata 24 and the value of the attribute item "TLS setting" in the image forming apparatus 30 match. With the above, the setting process shown in FIG. 16 is ended.

In addition, in a case of receiving the DS message from the service 21 that has transmitted the setting information, the agent 31 may consider that a conflict has occurred, not request the service 21 for the setting information by omitting steps S360 and S370 in FIG. 16, and return the value of the attribute item set in step S300 to the original value before the setting. Further, in the above example, in step S210 of FIG. 16, the service 21 requests the DS job management unit 27 to create a DS job for setting the value of the designated attribute item. However, the service 21 may transmit the instruction to set the value of the attribute item directly to the agent 31 through the service connection, and cause the agent 31 to change the setting.

As described above, according to the service providing system 1 according to the present exemplary embodiment, depending on the function instructed to be executed by the image forming apparatus 30, the SC 20 is notified of necessary information through the service connection regardless of the term.

There is also a service 21 that is not included in the SC 20 on the cloud service. The service providing system 1 according to the present exemplary embodiment may provide the function of the image forming apparatus 30 on the Internet 2, by using not only the service 21 included in the SC 20 provided by the developer of the image forming apparatus 30 (referred to as "native service 21") but also the service 21 provided by a third party (referred to as "external service 21").

Up to this point, the synchronization process and the setting process of the service providing system 1 have been described. However, the service 21 provided by the SC 20 as a cloud service also includes, for example, a service 21 that prints image data designated by a remote user by the image forming apparatus 30.

In a case where the image data to be printed is received from the remote user in such a service 21, the SC 20 notifies the image forming apparatus 30 that the image data has been received, and performs a printing process in cooperation with the image forming apparatus 30.

Here, as an example, a process in the service providing system 1 in a case where image data is printed by using the service 21 provided by a third party will be described.

FIG. 18 is a sequence diagram showing an example of a data flow in the service providing system 1 in a case where the image data is received from the user terminal 10. As an example, the external service 21 is used for the service 21 (referred to as "print service 21") that receives image data from the user terminal 10, but the native service 21 may be used.

In a case where the remote user transmits image data from the user terminal 10 to the print service 21 (FIG. 18: (1)), the user ID of the remote user who has transmitted the image data and the image data are registered in the print service 21 in association with each other. The user ID is identification information issued in advance for each user in order to identify the user in a case where the service providing system 1 is used for the first time.

In a case where the print service 21 which registers the image data notifies the DS job management unit 27 that there is an instruction to register the image data, the DS job management unit 27 creates a DS job (FIG. 18: (2)).

Then, the DS job management unit 27 requests the DS 22 to transmit a DS message notifying the RD 32 that the image data has been registered (FIG. 18: (3)). As described above, the access information to the print service 21 in which the image data is registered, the agent identification information for executing the print function, and the job number of the DS job that manages the printing process of the registered image data are added to the DS message.

The RD 32 acquires the DS message from the DS 22 by polling executed during the term (FIG. 18: (4)), and delivers the DS message to the agent 31 represented by the agent identification information added to the DS message (FIG. 18: (5)).

The agent 31 that has received the DS message establishes a service connection with the print service 21 with reference to the access information added to the DS message (FIG. 18: (6)).

Then, a remote user who has registered the image data in the print service 21 from the user terminal 10 moves to the installation place of the image forming apparatus 30, and this time, as a neighboring user, inputs the user ID to the input unit 12 of the image forming apparatus 30 (referred to as "user authentication"). Accordingly, in a case where the user authentication is performed in the image forming apparatus 30 and the input user ID is registered in advance, the image forming apparatus 30 continues to receive the operation from the input unit 12 (FIG. 18: (7)).

In a case where the user authentication is successful, the image forming apparatus 30 displays a list of functions available in the image forming apparatus 30 on the display unit 13. In a case where the neighboring user selects a function to be used from the list of available functions (here, a print function using the print service 21 is selected), the RD 32 notifies the agent 31 that executes the function of the print service 21 of a print instruction to which a user ID of a neighboring user who is operating is added (FIG. 18: (8)).

The agent 31 that has received the print instruction acquires a list of image data associated with the user ID with the print instruction attached thereto, from the print service 21 through the service connection (FIG. 18: (9)), and displays the list on the display unit 13 of the image forming apparatus 30.

In a case where a neighboring user selects image data to be printed from the list of image data, the RD 32 notifies the agent 31 executing the function of the print service 21 of a selection instruction for notifying the selected image data (FIG. 18: (10)).

Upon receiving the selection instruction, the agent 31 acquires the selected image data from the print service 21 through the service connection (FIG. 18: (11)), and prints the acquired image data. In a case where the agent 31 transmits a print completion notification to the DS 22 via the state notification connection after ending the printing of the image data (FIG. 18: (12)), the DS job for managing the printing of the image data disappears. The agent 31 that has established the service connection with the print service 21 may establish a state notification connection with the DS 22, and notify the state information that "the connection with the print service 21 has been established", as already explained.

In a case where the image data is printed by using the print service 21 in this way, for example, in the image forming apparatus 30, it is preferable that preparation for acquiring the image data registered in the print service 21 has already been ended, at the stage where the user authentication of the neighboring user is successful. Therefore, for example, it is preferable that the service connection for connecting the print service 21 and the agent 31 is established before the user authentication of the neighboring user is performed by the image forming apparatus 30.

Although the configuration of the service providing system 1 has been described with an example of executing the function of the image forming apparatus 30, the apparatus to which the function is provided by the service providing system 1 is not limited to the image forming apparatus 30. For example, any apparatus such as a surveillance camera, a home appliance, or a moving object such as a vehicle that can be connected to the Internet 2 and of which operation content can be changed according to a user's instruction can be applied to the service providing system 1.

Although one aspect of the service providing system 1 has been described above using the exemplary embodiment, the disclosed mode of the service providing system 1 is an example, and the mode of the service providing system 1 is not limited to the scope described in the exemplary embodiment. Various modifications and improvements can be added to the exemplary embodiments without departing from the gist of the present disclosure, and the exemplary embodiments to which the modifications or improvements are added are also included in the technical scope of the present disclosure. For example, within a scope without departing from the gist of the present disclosure, the internal order of each of the synchronization process shown in FIGS. 6, 8 and 10 and the setting process shown in FIG. 14 and FIG. 16 may be changed.

For example, in FIG. 17, a DS job is generated in order to eliminate a conflict that has occurred, and a DS message is delivered by a synchronization connection which is a route through which communication is periodically performed according to a synchronization interval to eliminate the conflict of the value of the attribute item. However, various types of information may be transmitted using a service connection, which is a path for immediate communication without delay as soon as the SC 20 is notified of the value of an attribute item of which setting has been changed by the RD 32. In this case, the setting information is sent to the image forming apparatus more quickly than using the synchronization connection.

Further, in the example shown in FIGS. 16 and 17, the value of the attribute item set by the neighboring user is reflected in the system 33, and then the SC 20 is notified of the set value of the attribute item, but the value of the attribute item set by the user may not be reflected in the system 33 and may be temporarily suspended. The SC 20 is notified of the suspended setting from the agent 31 through the service connection. In the subsequent process, as described above, the service 21 makes a determination based on the priority table 26, and the image forming apparatus 30 receives the determination result of the service 21 through the synchronization connection. The agent 31 may reflect the value of the attribute item set by the neighboring user for the first time in the system 33, in a case where the determination result received from the SC 20 is the update permission indicating that the value of the attribute item may be updated.

Further, in the examples shown in FIGS. 15 to 17, although the setting information is transmitted to the image forming apparatus 30 and the SC 20 through the service connection, the setting information may be transmitted only by using the synchronization connection without using the communication by the service connection.

Further, in the examples shown in FIGS. 15 and 17, the priority table 26 is stored on the SC 20 side, but the same priority table 26 as the priority table 26 stored by the SC 20 may be also stored on the image forming apparatus 30 side. In a case where the image forming apparatus 30 has the priority table 26, the image forming apparatus 30 may specify which data has priority over the SC 20, so that the image forming apparatus 30 may temporarily suspend the reception of the setting information in which "DS priority" or "time stamp priority" is set for priority information, and process the reception after the synchronization process is executed. Further, in a case of receiving the setting information in which the priority information is set to "DS fixed", the image forming apparatus 30 may end the process without reflecting the setting information in the system 33. Further, in a case of receiving the setting information in which the priority information is set to "RD priority" or "RD fixed", the image forming apparatus 30 may immediately reflect the setting information in the system 33. Since the priority table 26 may be changed, the priority table 26 is transmitted from the SC 20 to the image forming apparatus 30 by using the synchronization connection or the service connection each time the change is made, and the same priority table 26 is maintained between the SC 20 and the image forming apparatus 30.

In addition, in the exemplary embodiment, a mode in which each process is implemented by software has been described as an example. However, the identical process as the flowchart illustrated in FIGS. 6, 8, 10, 14, and 16 may be processed by hardware. In this case, the processing speed is increased as compared with the case where each process is implemented by software.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

In the above exemplary embodiment, the example in which the program is stored in the non-volatile memories 44 and 54 has been described, but the storage destination of the program is not limited to the non-volatile memories 44 and 54. The program of the present disclosure can also be provided in a form recorded on a storage medium readable by the computers 40 and 50. For example, the program may be provided in a form recorded on an optical disk such as a Compact Disk Read Only Memory (CD-ROM) and a Digital Versatile Disk Read Only Memory (DVD-ROM). Further, the program may be provided in a form recorded in a portable semiconductor memory such as a Universal Serial Bus (USB) memory and a memory card. Further, the program may be provided in a form recorded in the ROMs 42 and 52. The ROMs 42 and 52, the non-volatile memories 44 and 54, the CD-ROM, the DVD-ROM, the USB, and the memory card are examples of non-transitory storage media.

Further, the image forming apparatus 30 and the computer 40 may download a program from an external apparatus (not shown) through the Internet 2 and store the downloaded program in the storage device. In this case, the CPU 51 of the image forming apparatus 30 may read the image forming program downloaded from the external apparatus, from the storage device, and execute various processes, and the CPU 41 of the computer 40 may read the server program downloaded from the external apparatus, from the storage device, and execute various processes.

The following are supplementary notes relating to the technique of the present disclosure.

(((1)))

A service providing system comprising:
a first apparatus including at least one agent unit that is connected to a service providing a pre-configured function over the Internet, and an execution unit that has first attribute data including state information about the first apparatus and setting information about a function of the first apparatus, and uses the first attribute data to execute an instructed function in cooperation with the agent unit, in a case of receiving the instruction regarding execution of the function; and
a second apparatus including a shadow execution unit that has second attribute data corresponding to the first attribute data and executes the instruction received from the service and a process requested by the execution unit,
wherein, through a first connection provided between the execution unit and the shadow execution unit, the execution unit checks whether there is a message generated by the shadow execution unit, acquires the message in a case where there is the message, and delivers the message to the agent unit represented by identification information attached to the message, and
the agent unit to which the message is delivered acquires information necessary for executing a function from the service, through a second connection provided between the agent unit and the associated service, and executes the instructed function.

(((2)))

The service providing system according to (((1))),
wherein the execution unit checks whether there is the message in accordance with a period of a synchronization process to be executed at predetermined intervals such that contents of the first attribute data and contents of the second attribute data, which are updated according to an instruction from a user, are identical to each other.

(((3)))

The service providing system according to (((1))) or (((2))),
wherein the agent unit provides the second connection between the agent unit and the service represented by connection information added to the message.

(((4)))

The service providing system according to (((3))),
wherein the second connection is a connection in which bidirectional communication is performed between the agent unit and the service.

(((5)))

The service providing system according to (((3))) or (((4))),
wherein the connection information includes place information specifying the service.

(((6)))

The service providing system according to any one of (((3))) to (((5))),
wherein the connection information includes connection permission information issued by the service.

(((7)))

The service providing system according to any one of (((1))) to (((6))),
wherein the shadow execution unit generates the message, in a case of receiving an instruction from the service, and
the agent unit notifies the shadow execution unit of state information regarding the instructed function through a third connection provided between the agent unit and the shadow execution unit.

(((8)))

The service providing system according to (((7))),
wherein the third connection is a connection in which unidirectional communication is performed from the agent unit to the shadow execution unit.

(((9)))

The service providing system according to (((7))) or (((8))),
wherein the message includes identification information for identifying the instruction received by the shadow execution unit.

(((10)))

The service providing system according to any one of (((7))) to (((9))),
wherein the state information regarding the instructed function includes identification information for identifying the instruction received by the shadow execution unit.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A service providing system comprising:
a first apparatus including at least one agent unit that is connected to a service providing a pre-configured function over the Internet, and an execution unit that has first attribute data including state information about the first apparatus and setting information about a function of the first apparatus, and uses the first attribute data to execute an instructed function in cooperation with the agent unit, in a case of receiving the instruction regarding execution of the function; and
a second apparatus including a shadow execution unit that has second attribute data corresponding to the first attribute data and executes the instruction received from the service and a process requested by the execution unit,
wherein, through a first connection provided between the execution unit and the shadow execution unit, the execution unit checks whether there is a message generated by the shadow execution unit, acquires the message in a case where there is the message, and delivers the message to the agent unit represented by identification information attached to the message, and
the agent unit to which the message is delivered acquires information necessary for executing a function from the service, through a second connection provided between the agent unit and the associated service, and executes the instructed function.

2. The service providing system according to claim 1,
wherein the execution unit checks whether there is the message in accordance with a period of a synchronization process to be executed at predetermined intervals such that contents of the first attribute data and contents of the second attribute data, which are updated according to an instruction from a user, are identical to each other.

3. The service providing system according to claim 1,
wherein the agent unit provides the second connection between the agent unit and the service represented by connection information added to the message.

4. The service providing system according to claim 3,
wherein the second connection is a connection in which bidirectional communication is performed between the agent unit and the service.

5. The service providing system according to claim 3,
wherein the connection information includes place information specifying the service.

6. The service providing system according to claim 3,
wherein the connection information includes connection permission information issued by the service.

7. The service providing system according to claim 1,
wherein the shadow execution unit generates the message, in a case of receiving an instruction from the service, and
the agent unit notifies the shadow execution unit of state information regarding the instructed function through a third connection provided between the agent unit and the shadow execution unit.

8. The service providing system according to claim 7,
wherein the third connection is a connection in which unidirectional communication is performed from the agent unit to the shadow execution unit.

9. The service providing system according to claim 7,
wherein the message includes identification information for identifying the instruction received by the shadow execution unit.

10. The service providing system according to claim 7,
wherein the state information regarding the instructed function includes identification information for identifying the instruction received by the shadow execution unit.

* * * * *